United States Patent [19]
Rideout et al.

[11] Patent Number: 5,880,863
[45] Date of Patent: Mar. 9, 1999

[54] RECONFIGURABLE RING SYSTEM FOR THE TRANSPORT OF RF SIGNALS OVER OPTICAL FIBERS

[75] Inventors: William C. Rideout, Townsend; Robert J. Regan, Needham; Douglas Tang, Chelmsford, all of Mass.

[73] Assignee: GTE Laboratories Incorporated, Waltham, Mass.

[21] Appl. No.: 600,689

[22] Filed: Feb. 13, 1996

[51] Int. Cl.$^6$ .................................................. H04B 10/20
[52] U.S. Cl. .......................... 359/119; 359/110; 359/137; 359/172
[58] Field of Search .................................... 359/124, 152, 359/164, 119, 125, 145, 172, 173, 110, 136, 137; 370/328; 455/422, 445

[56] References Cited

U.S. PATENT DOCUMENTS

| | | | |
|---|---|---|---|
| 4,789,983 | 12/1988 | Acampora et al. | 370/96 |
| 4,807,222 | 2/1989 | Amitay | 370/338 |
| 5,210,753 | 5/1993 | Nalarajan | 370/338 |
| 5,251,053 | 10/1993 | Heidemann | 359/145 |
| 5,321,542 | 6/1994 | Freitas et al. | 370/338 |
| 5,339,184 | 8/1994 | Tang | 359/124 |
| 5,519,691 | 5/1996 | Darcie et al. | 370/18 |
| 5,570,084 | 10/1996 | Ritter et al. | 370/338 |
| 5,576,875 | 11/1996 | Chawki et al. | 359/125 |
| 5,625,478 | 4/1997 | Doerr et al. | 359/119 |

OTHER PUBLICATIONS

Fye, Donald, M, Design of Fiber Optic Antenna Remoting Links for Cellular Radio Applications, 1990 IEEE, pp. 622–625.

Stevens, William E. et al., "A 1.3–$\mu$m Microwave Fiber–Optic Link Using A Direct–Modulated Laser Transmitter", Journal of Lightwave Technology vol. LT3 No. 2, Apr., 1985, pp. 308–315.

*Primary Examiner*—Rafael Bacares
*Attorney, Agent, or Firm*—Leonard Charles Suchyta

[57] ABSTRACT

A reconfigurable ring architecture for RF transport over fibers which eliminates the need for multiple pairs of fibers to serve multiple microcells and the need for backup communications lines as a result of system failure due to a fiber break. The ring architecture has a plurality of remote units which are interconnected to a host unit in a serial fashion. The host unit transmits signals to the plurality of remote units and receives signals from the plurality of remote units. Each of the remote units having photodetectors for receiving the transmitted signals and an antenna/transmitter for receiving other signals from another source; a splitter for splitting the transmitted signals into two parts, one part of the signals being output from the remote unit and the other part of the signals being transferred to adjacent remote units and then back to the host unit; and a transmitter for transferring the other signals from the remote unit to adjacent remote units and then back to the host unit. The transmission and reception of signals taking place even in the event of failure of a remote unit or the interconnection between remote units.

20 Claims, 20 Drawing Sheets

RECONFIGURABLE RING SYSTEM FOR THE TRANSPORT OF RF SIGNALS OVER OPTICAL FIBERS

FIELD OF THE INVENTION

The present invention relates generally to the transport of RF signals over optical fibers and, more particularly, to a reconfigurable ring system for transporting RF signals over optical fibers in antenna remoting or microcell applications.

BACKGROUND OF THE INVENTION

The transport of radio frequency (RF) signals over optical fibers has many applications in the cellular and personal communication systems (PCS) industry.

Basically, most voice and data is carried through the public switched telephone network as digital data. For a voice channel, this data is typically 64 kbit/sec. However, this format is incompatible with what a cellular or PCS provider needs to broadcast through the air. In the case of a typical analog cellular voice channel, the 64 kbit/sec channel is first converted to analog, and then to a 30 kHz wide FM signal, and finally this 30 kHz signal is upconverted to near 800 MHz to be broadcast through the air.

For the new generation of digital cellular or PCS even more conversion is required. First, the 64 kbit/sec signal is digitally compressed to a lower bit rate to save spectrum. Thereafter, other signal processing is performed, such as code or time division multiplexing (depending on which digital air interface is used), before the signal is upconverted to its RF frequency. All this conversion requires a substantial amount of electronics, which is located at the cellular base station. Furthermore, presently, in the industry, there is a desire to use smaller cell areas called microcells to provide cost effective coverage of dead spots and to increase capacity. However, the necessity of duplicating all the electronics required for the conversions described above reduces the advantages of this microcell approach.

The concept of transport over optical fibers involves carrying the signal intended for broadcast over the antenna in a form as close as possible to its final one, so that no conversions are required at the microcell site. Such an approach is described in the following publications: W. E. Stevens and T. R. Joseph, "A 1.3 μm Microwave Fiber-Optic Link Using a Directly Modulated Laser Transmitter," IEEE J. Lightwave Tech., Vol. LT-3, No. 2, pp. 308–315 (1985) and D. M. Fye, "Design of Fiber Optic Antenna Remoting Links for Cellular Radio Applications," Proc. 40th IEEE Vehic. Tech. Conf., pp. 622–625, June 1990. In such a case the signals are carried at the RF frequencies which are near 800 MHz for cellular and near 1800 MHz for PCS. These very high frequencies are the reason optical fibers are required. To carry the signals over coaxial cable would require numerous microwave amplifiers which could degrade signal quality.

In the past, systems for RF transport over optical fibers involved the use of a star configuration or architecture, with point-to-point transmission between the base station and each microcell. Such a system involved the use of a separate single pair of fibers to connect a base station with each microcell. If two or more microcells were served from one base station, then separate additional pairs of fibers with associated lasers and photodetectors were required between the base station and each of the additional microcells. This type of arrangement was extremely expensive. Furthermore, in the event of a break in an optical fiber between the base station and the microcell, the RF transport link ceased to function, causing the microcell to fail and operation to end.

It is therefore an object of this invention to provide a reconfigurable ring system for the transport of RF signals to a plurality of remote units such as cell areas or microcells.

It is a further object of this invention to provide a reconfigurable ring system which enables a plurality of microcells to be served by a single pair of optical fibers interconnected between all of the remote units.

It is another object of this invention to provide a reconfigurable ring system for the transport of RF signals which permits all the remote units within the system to remain fully operational even in the event a pair of fibers is cut or damaged.

It is still a further object of this invention to provide a reconfigurable ring system for the transport of RF signals which, even in the event of failure of one of the remote units, permits all the other remote units in the system to remain fully operational.

SUMMARY OF THE INVENTION

The present invention overcomes problems associated with past systems for the transportation of RF signals over optical fibers. More specifically, the reconfigurable ring architecture for RF transport over fibers of this invention overcomes the two major problems listed above; that is, (1) the need for multiple pairs of fibers to serve multiple microcells and (2) the need for backup communications lines as a result of system failure due to a fiber break.

Prior cellular or personal communications systems generally rely upon the base station being connected to a series of remote sites by separate pairs of optical fibers, each pair of optical fibers being connected between the base station and each remote unit or site. The present invention utilizes a ring topology, with a single pair of optical fibers running between the host unit (which is connected to a base station) and a first remote site, and continuing therefrom to each adjacent site, with the last remote site being connected back at the base station. The key point in the ring topology of the present invention is that there exists two separate physical paths between the antenna remoting host unit and any remote site. This means that no one single link breakdown or remote unit failure can disconnect the host unit and any remote site. In the description of the invention, the term remote site or unit is an all encompassing term which may include, but is not limited to, a cell area or microcell.

The two necessary parts of the reconfigurable ring architecture for antenna remoting of the present invention are the ring architecture itself and the method of reconfiguration. Described below are examples of various possible ring architectures within the scope of the present invention together with the desired methods of reconfiguration.

One embodiment of this invention incorporates therein a broadcast ring approach in which all the signals in the downlink (transmission from the host unit to the remote site) path are sent to every remote unit, so that no multiplexing scheme is required. Although an extremely effective system, a disadvantage of the broadcast ring is that the receiver sensitivity of the uplink is reduced because the noise of the uplink (transmission from the remote site to the host unit) path is increased by a factor of n, where n is the number of remote units on the ring. The other disadvantage of the broadcast technique is its reduced capacity compared to the multiplexed technique described below. That is, a channel that is being used in one microcell cannot be used simultaneously in another microcell in the same ring unless one uses the multiplexed technique.

In the broadcast ring technique, the downlink connection works as follows: The downlink channels for all the remote units travel from the base or host unit to the first remote at the downlink frequency over a linear fiber optic cable. At the first remote unit, the signal is detected by a photodetector, and then split into two paths. One path leads directly to the transmitter antenna of the first remote unit, while the other path leads to a laser, and then on to the next remote unit. This process continues until all the remote units have been reached.

The uplink channels work as follows: At each remote unit the uplink signals are collected by the antenna, and then combined with all the uplink signals from the remote units with a higher number, that is, the next further remote unit from the host unit. This signal is then transmitted over an analog fiber optic cable to the remote unit with the next lower number, that is, the next closer remote unit to the host unit. This process continues until the uplink signals reach the host unit.

Another embodiment of the present invention incorporates therein a multiplexed ring architecture. In the multiplexed ring of this invention, the signals for each remote unit can be separated, so that individual channels sets can be broadcast from each remote unit. In this way, the uplink noise can be kept separate for each unit so that the receiver noise does not accumulate as in the broadcast ring. Also, as discussed above, the multiplexed ring allows two or more microcells to simultaneously use the same channel, therefore increasing system capacity.

Although there are a number of methods to multiplex the signals to or from the remote units, the preferred method involves frequency division multiplexing. In this system, any particular remote unit only uses a small fraction of the possible bandwidth of the fiber optic link. Multiplexing can then be achieved by frequency converting each downlink signal set at the host unit to a different intermediate frequency. These separate intermediate frequencies are then combined and sent over the fiber link or cables to the first remote site. At the remote site, the signal is split into two. One part of the signal is frequency converted back to the original cellular downlink frequency using a frequency converter that selects only the intermediate frequency intended for the first remote unit or site. The other part of the signal is amplified and sent out over another fiber optic cable or link to the second remote site At the second remote unit or site, the downlink signal is again split, with one part continuing on to the next remote unit, and the other part being frequency converted for broadcast out the antenna. Again, the frequency converter of the second remote unit is chosen to pass only the designated intermediate frequency. This process continues until the downlink signal reaches the last remote unit. At that unit, part of the signal is frequency converted for broadcast out the antenna, and part is transmitted out the fiber cable or link, this time back to the host unit. This last fiber optic link serves no purpose other than possible monitoring functions when the system is operating normally, since the downlink signal is simply returning to its source.

The multiplexing of the uplink signal proceeds in a similar manner as above. At each remote unit the cellular band is received from an antenna, and then frequency converted to an individual intermediate frequency. This signal is then combined with the other uplink signals from the higher numbered remote units, and is sent via the fiber optic cable or link to the next lower numbered remote unit. This process is repeated until all the uplink signals reach the host unit. There the signals are split, and then separate frequency converters convert that signal back to the original uplink frequency. In this way, the uplink signals are separated so that their signal/noise ratio is not affected by the number of remote units. This is the advantage of the multiplexed ring embodiment of this invention over the broadcast ring embodiment of this invention. Also, as discussed above, the multiplexed ring allows two or more microcells to simultaneously use the same channel, therefore increasing system capacity. As with the broadcast configuration, the uplink and downlink fiber optic links between the last remote in the ring and the host unit play no role in the normal (unreconfigured) operation of the system. More specifically, during normal operation (1) the downlink optic link between the last remote site and the host unit (source) is merely returning the downlink signal to its source for monitoring purposes, and (2) the uplink optic path between the last remote site and the host unit remains inactive until activated during reconfiguration.

Another embodiment of this invention utilizes a ring configuration where the unused pair of fiber optic links is in the middle of the ring rather than the end. The multiplexing in this configuration is similar to that described above, except that in normal operation the downlink signals meant for the upper part of the ring are sent only to the upper part, and those meant for the lower part are sent only to the lower part. Reducing the number of remote units served by any one fiber optic cable or link increases performance by decreasing the amount of intermodulation distortion. This is the advantage of putting the unused link in the middle of the ring.

Another embodiment of this invention utilizes wavelength division multiplexing. For example, each remote unit is assigned its own wavelength laser at the host unit, and uses optical filters to chose the signal meant for it. The uplink works in the same way, with each uplink laser having a distinct wavelength, with optical filters provided at the host units.

The operation of the reconfigurable system is described above and all RF signals are received and transmitted with the framework of the system as described. However, when a failure is detected between the host unit and a particular remote unit, the remote unit resets its microwave switches, with the result that its downlink laser and photodetector becomes its uplink laser and photodetector, and its uplink laser and photodetector becomes its downlink laser and photodetector. This, in effect, causes all the remotes affected by the fiber break to communicate with the host unit using the normally unused link between the last remote and the host unit. If a failure is detected between a remote unit and the last remote unit in the ring, that particular remote unit does not reconfigure, since it is not affected by that failure. Reconfiguration could also be performed in a wavelength division multiplexing system. In this case the switching elements would be either tunable lasers or tunable wavelength filters.

For a better understanding of the present invention, together with other and further objects, reference is made to the following description taken in conjunction with the accompanying drawings, and its scope will be pointed out in the appended claims.

DETAILED DESCRIPTION OF THE PREFERRED EMBODIMENTS

The reconfigurable ring architecture for RF transport over optical fibers of this invention overcomes the problems of past systems for transporting RF signals to remote sites. More specifically, the present invention eliminates the need for multiple pairs of fibers to serve multiple remote units from a base station and eliminates system failure due to a fiber break.

Figure 1:
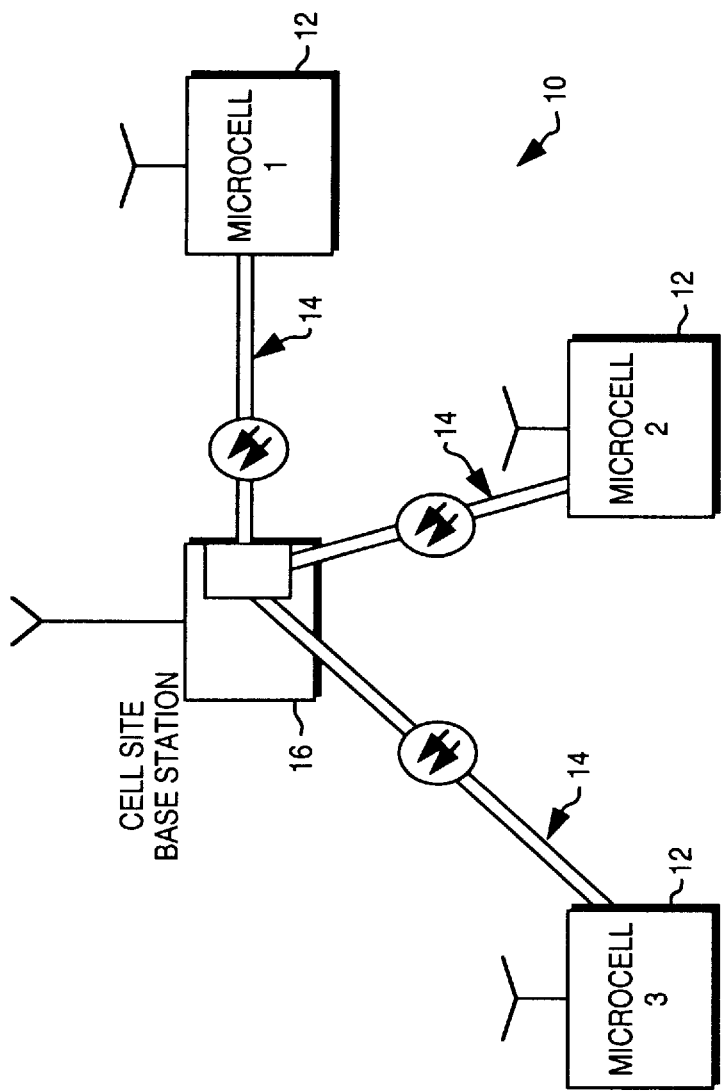
FIG. 1 is a schematic representation of a prior art example of a star configuration or architecture for RF signal transmission to remote units.

FIG. 1 of the drawings illustrates the prior art configuration 10 of RF transmission to multiple units or sites 12 by the use of separate fiber optic links 14 between the base station 16 and the remote units or sites 12. Depending on the distance of the sites 12 from the base station 16, optical fiber costs could be extensive. In addition, any break of a link will cause system failure of the associated remote unit.

Figure 2:
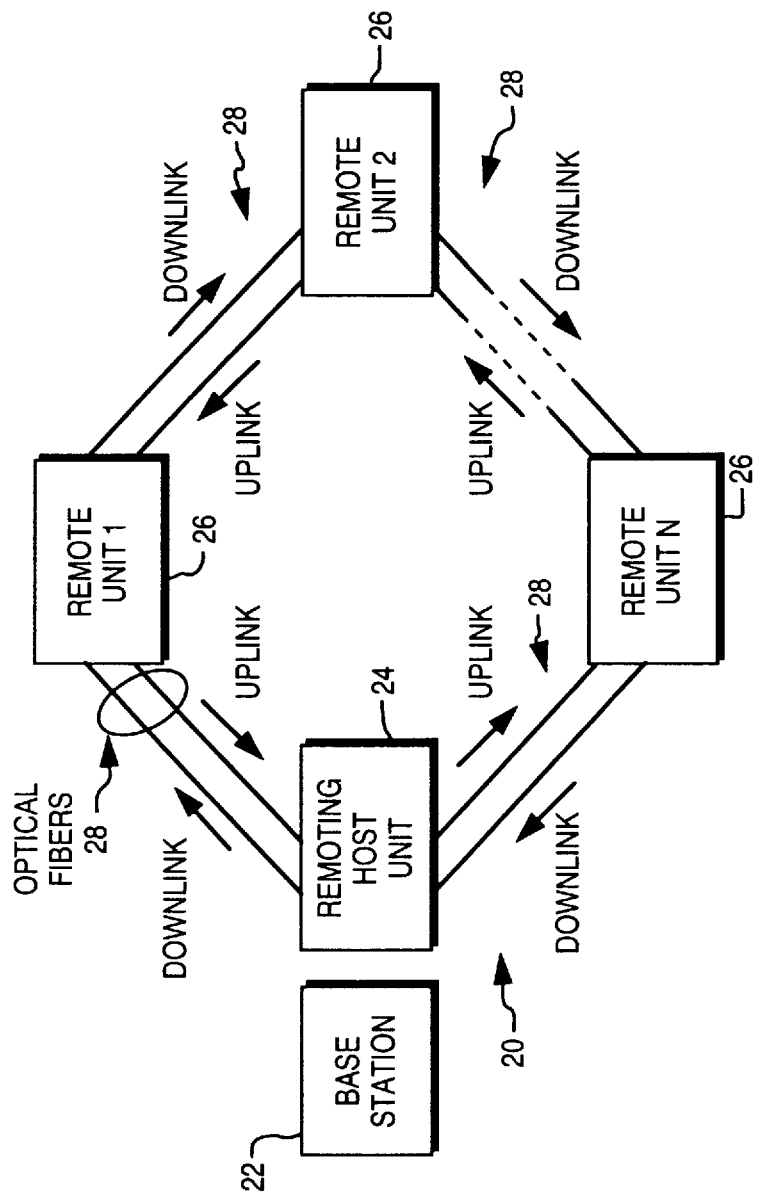
FIG. 2 is a schematic diagram of the reconfigurable ring architecture of this invention for RF signal transmission to remote units.

The transmission system or configuration 20 of the present invention is broadly illustrated in FIG. 2 of the drawings. The basic system 20 shows the cellular or personal communications system base station 22 connected to remoting host unit 24 which in turn is connected serially to a series of N remote sites, units or microcells 26. Since remote unit N is representative of one or more units, these could be, for example, other remote units such as units #3, #4, etc. interposed between units #2 and #N. The use of the terms remote site, unit or microcell will be used interchangeably within the description of the invention and encompasses any other type of equivalent remote unit.

The remote units 26 are connected in a ring topology, with two optical fibers 28 between the host unit 24 and the first remote unit 26, two optical fibers 28 between each adjacent remote unit 26, and two optical fibers 28 between the last remote unit 26 and the host unit 24. This arrangement eliminates the need for separate pairs of optical fibers between the host unit and each remote unit as shown in FIG. 1. Furthermore, in the ring topology used with this invention there exists two separate physical paths between the remoting host unit 24 and any remote site. This means that no one single link or remote unit failure can disconnect the host unit and any remote site.

The two requirements for the reconfigurable ring architecture of this invention are the ring architecture itself, and the method of reconfiguration. In the following description the various embodiments of the ring architectures are explained, together with their method of reconfiguration.

Figure 3A:
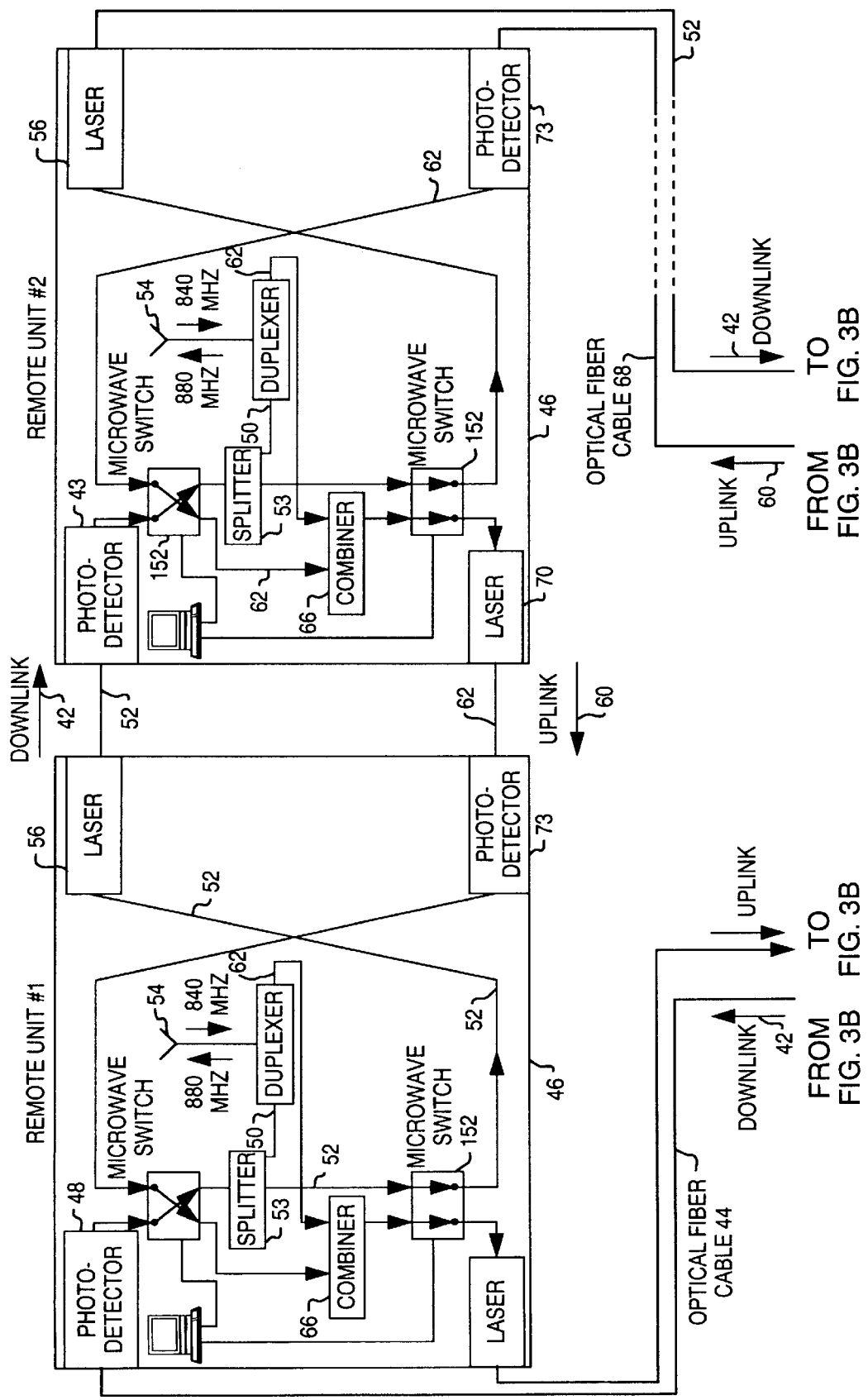
FIG. 3 is a schematic representation of a broadcast ring architecture of this invention for RF signal transmission to remote units.
Figure 3B:
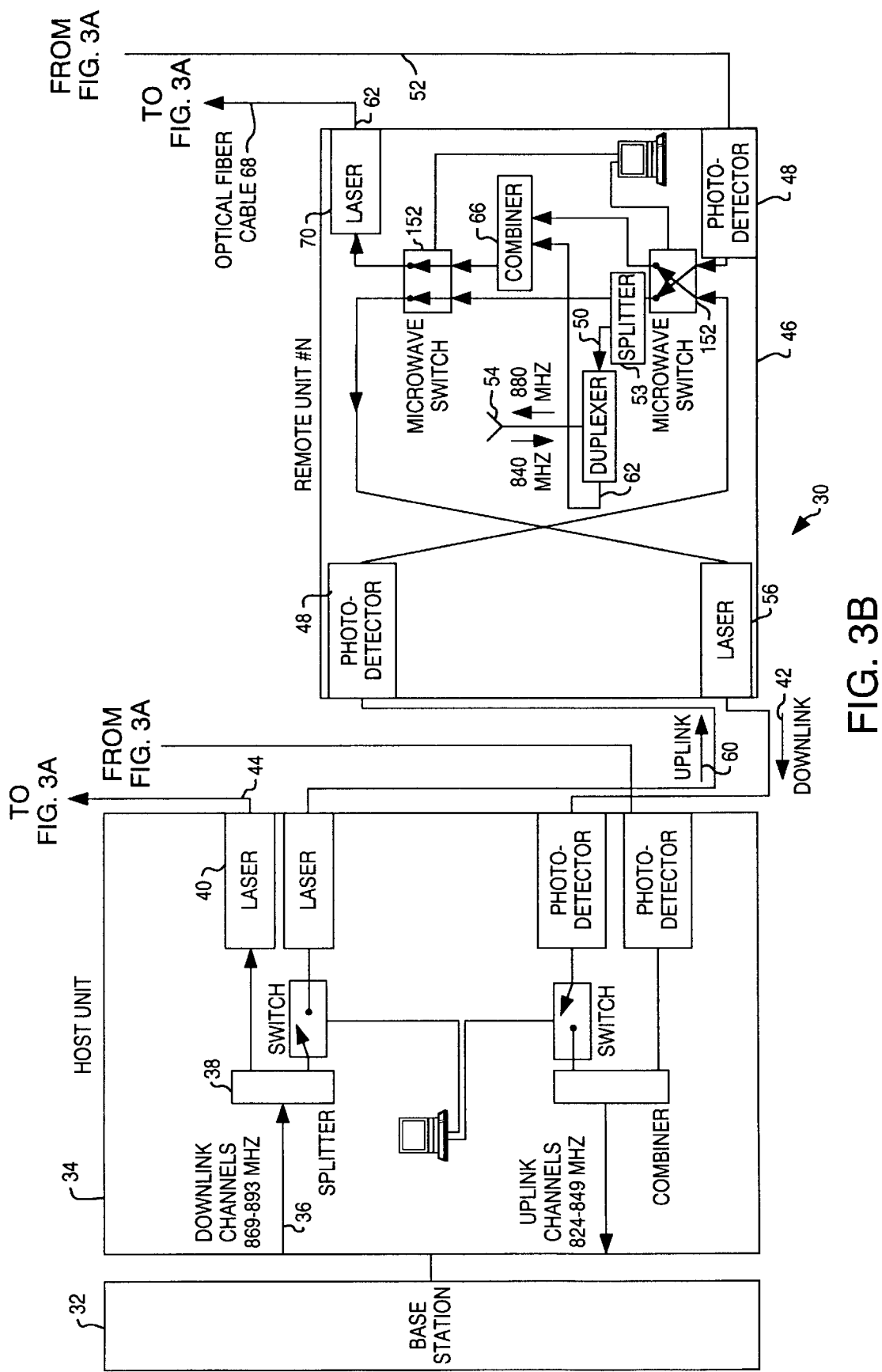

There are various possible ways to provide the operative ring architecture of this invention as shown in FIG. 2. One such embodiment of the invention is illustrated in FIG. 3 and will hereinafter be referred to as the broadcast ring architecture 30. In this approach, all the signals in the downlink path are sent to every remote unit, so that no multiplexing scheme is required. For example, in a cellular system, this means that every remote unit could be sent the same signals in the frequency range of 869–894 MHz so that no signal processing (except amplification) is required at the remote units.

More specifically, electrical signals received at base station 32 are converted into optical signals either at the base station 32 or host unit 34. At host unit 34 the downlink signals or channels 36 are split by conventional splitter 38 and output from host unit 34 by laser 40 to follow the downlink path in optical fiber 44. The downlink path being the transmission from the host unit to the remote site.

In the broadcast architecture 30, the downlink signal path 42 works as follows: The downlink channels for all the remote units 46 travel from the host unit 34 to remote unit #1 at the downlink frequency over a linear fiber optic cable 44. At the remote unit #1, the signal is detected by a photodetector 48, and then split by splitter 53 into two paths 50 and 52. One path 50 leads directly to the transmitter/receiver antenna 54, while the other path 52 leads to laser 56. From laser 56 the signal is transmitted to the next remote unit #2. This process continues until all the remote units 46 have been reached and the signal returns back to host unit 34. For clarity, similar elements in the remote units 46 will be represented by identical reference numerals.

The uplink signal path which is the transmission from the remote site 46 to the host unit 34 emanates at the remote site. The uplink signal path 60 works as follows: at each remote unit 46, the uplink signals 62 are collected by the transmitter/receiver antenna 54 and then combined in combiner 66 with all the uplink signals 62 from the remote units 46 with a higher number. This signal is then transmitted over analog fiber optic cable 68 to the remote unit with the next lower number. This process continues until the uplink signals 62 reach the host unit 34. For example, with respect to remote unit #2, uplink signal 62 is received at antenna 54, combined with uplink signal 62 transmitted by laser 70 of remote #N and received by photodetector 73 at remote unit #2, from which the combined signal 62 is output by laser 70 of remote unit #2 and received by photodetector 73 of remote unit #1. Remote unit #1 combines this signal with an incoming signal and transmits the resultant signal to host unit 34. The host unit 34 converts the optical signals back to electrical signals for transfer to base station 32 where the electrical signal can be sent out to a public switch telephone network.

Although there are many advantages associated with the broadcast architecture 30 of the present invention, including simplicity of operation, the disadvantage of the broadcast architecture 30 is that the receiver sensitivity of the uplink is reduced because the noise of the uplink is increased by a factor of n, where n is the number of remote units on the ring. For example, if the ring had four remote units, the receiver sensitivity would decrease by 10 log4=6 dB.

A further embodiment of this invention, although slightly more complex than the broadcast architecture 30 will be hereinafter referred to as the multiplexed ring architecture 71 shown in FIG. 4 of the drawings. In this embodiment of the present invention, the design of the system enables the signals for each remote unit to be separated, so that individual channel sets can be broadcast from each remote unit. In this way, the uplink noise can be kept separate for each unit and the receiver noise does not accumulate as in broadcast ring architecture 30.

Although there are numerous methods to multiplex the signals to or from the remote units, the multiplexed ring architecture 71 of this embodiment of the invention utilizes a frequency division multiplexing system. In such a system, each remote unit 72 requires less than 25 MHz of frequency bandwidth, whereas the broadcast frequency of a typical cellular system is around 800 to 900 MHz This means that any particular remote unit 72 only uses a small fraction of the possible bandwidth of the fiber optic link.

Figure 4A:
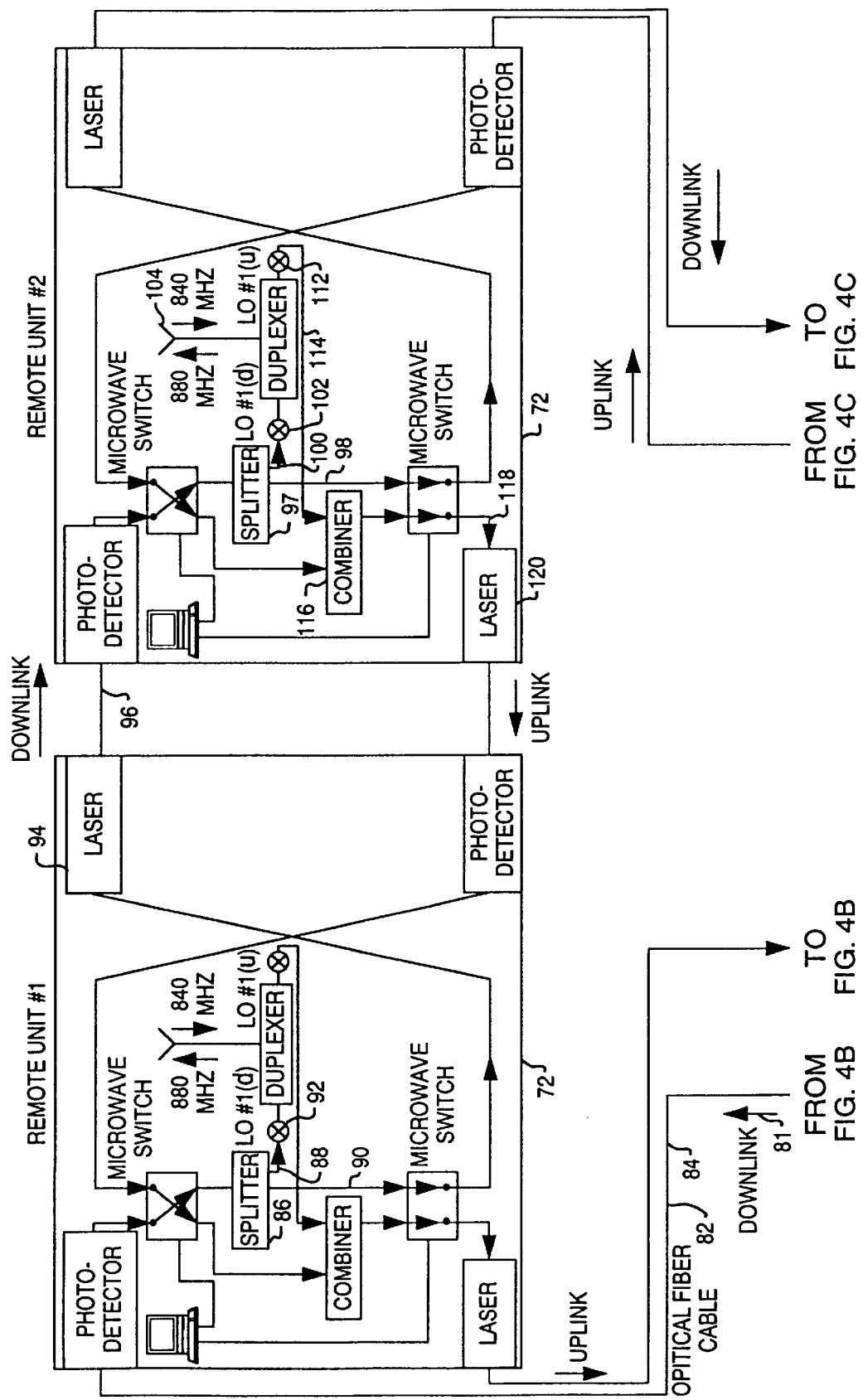
FIG. 4 is a schematic representation of a multiplexed ring architecture of this invention for RF signal transmission to remote units.
Figure 4B:
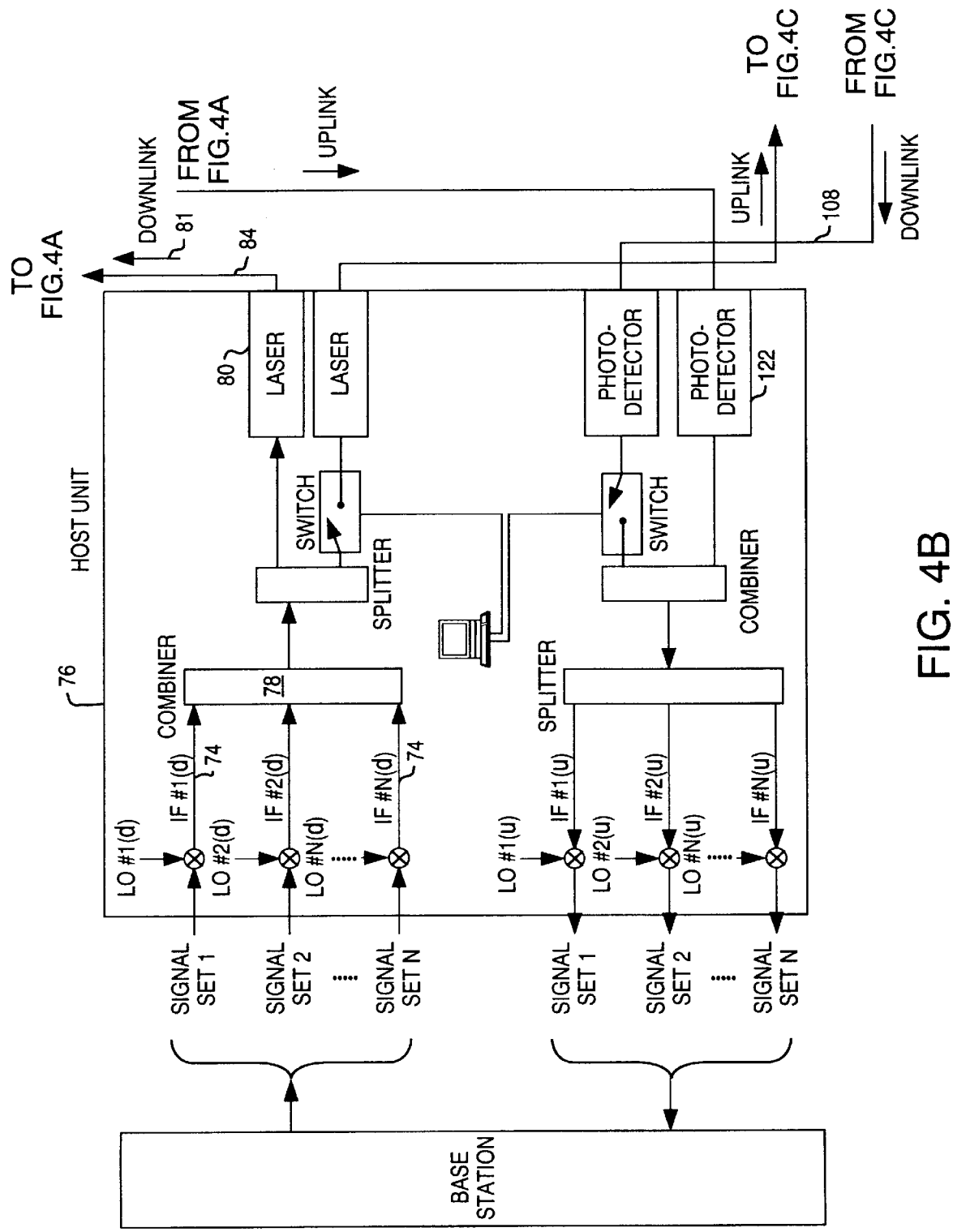
Figure 4C:
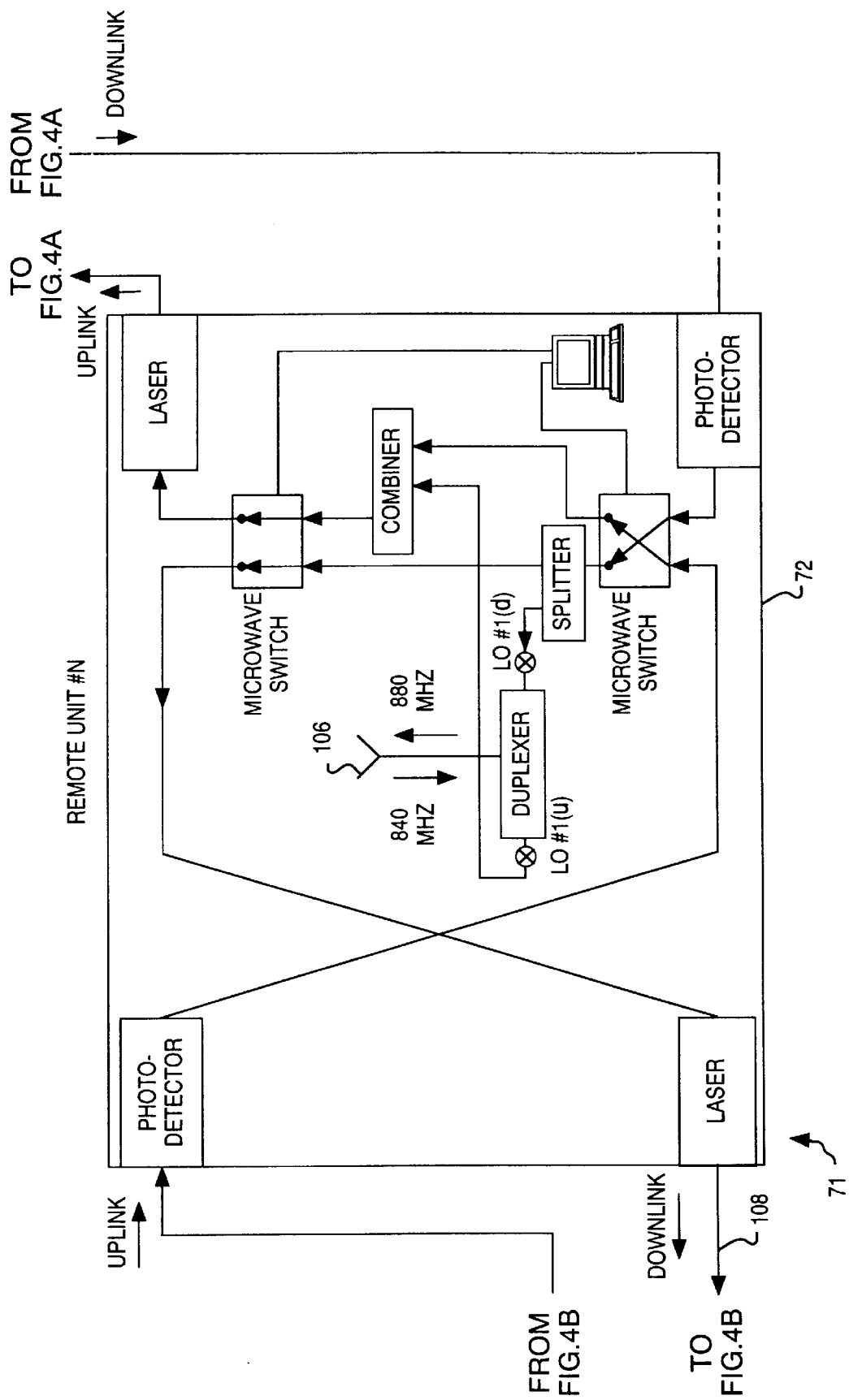

Multiplexing can then be achieved by frequency converting each downlink signal 74 set at the host unit 76 to a different intermediate frequency as shown in FIG. 4 of the drawings. These separate intermediate frequencies are then combined at combiner 78 within the host unit 76 and transmitted by laser 80 as the downlink path 81 over optical fiber cable 82 to the first remote unit #1. At the remote unit #1, the signal 84 is split by splitter 86 into two signals 88 and 90. One signal 88 is frequency converted back to the original cellular downlink frequency using a frequency converter 92 that selects only the intermediate frequency intended for remote site unit #1. The other part of signal 84, that is, signal 90, is amplified and sent by laser 94 out another fiber optic cable 96 to remote unit #2.

At remote unit #2, the downlink signal 96 is again split by splitter 97, with one signal 98 continuing on to the next remote unit #N, and the other signal 100 being frequency converted by frequency converter 102 for broadcast out the antenna 104. Again, frequency converter 102 of the remote unit #2 is chosen to pass only the designated intermediate frequency. This process continues until the downlink signal reaches the last remote unit #N. At remote unit #N, part of the signal is frequency converted for broadcast out the antenna 106, and part of the signal is transmitted out the optical fiber cable 108, this time back to the host unit 76. The last fiber optic link between remote unit #N and host unit 76 serves no purpose other than possible monitoring functions when the system is operating normally, since the downlink signal is simply returning to its source.

The multiplexing of the uplink signal proceeds in a similar way. At each remote unit the cellular band is received from an antenna. For example, referring to remote unit #2, antenna 104 receives a transmission signal and then this signal is frequency converted by frequency converter 112 to an individual intermediate frequency signal 114. Signal 114 is then combined at combiner 116 with the other uplink signals from the higher numbered remote units to produce signal 118. Signal 118 is sent from laser 120 via the fiber optic link to the next lower numbered remote unit #1.

This process is repeated until all the uplink signals reach the host unit 76 via photodetector 122. At host unit 76, the signals are split, and then separate frequency converters convert that signal back to the original uplink frequency. In this way, the uplink signals are separated so that their signal/noise ratio is not affected by the number of remote units.

Note that in the multiplexed ring configuration architecture 71 described above, the uplink and downlink fiber optic links between the last remote unit #N in the ring and the host unit 76 play no role in the normal (unreconfigured) operation of the system. Furthermore, it should be realized that in both the broadcast ring architecture 30 and the multiplexed ring architecture 71, although the individual components utilized within the host unit and the remote units are conventional, their arrangement within the host unit and remote units which permit continuous operation even in the event a failure of a fiber optic cable between remotes is unique. A detailed description of the configured ring architecture of this embodiment is set forth in detail hereinbelow.

Figure 5:
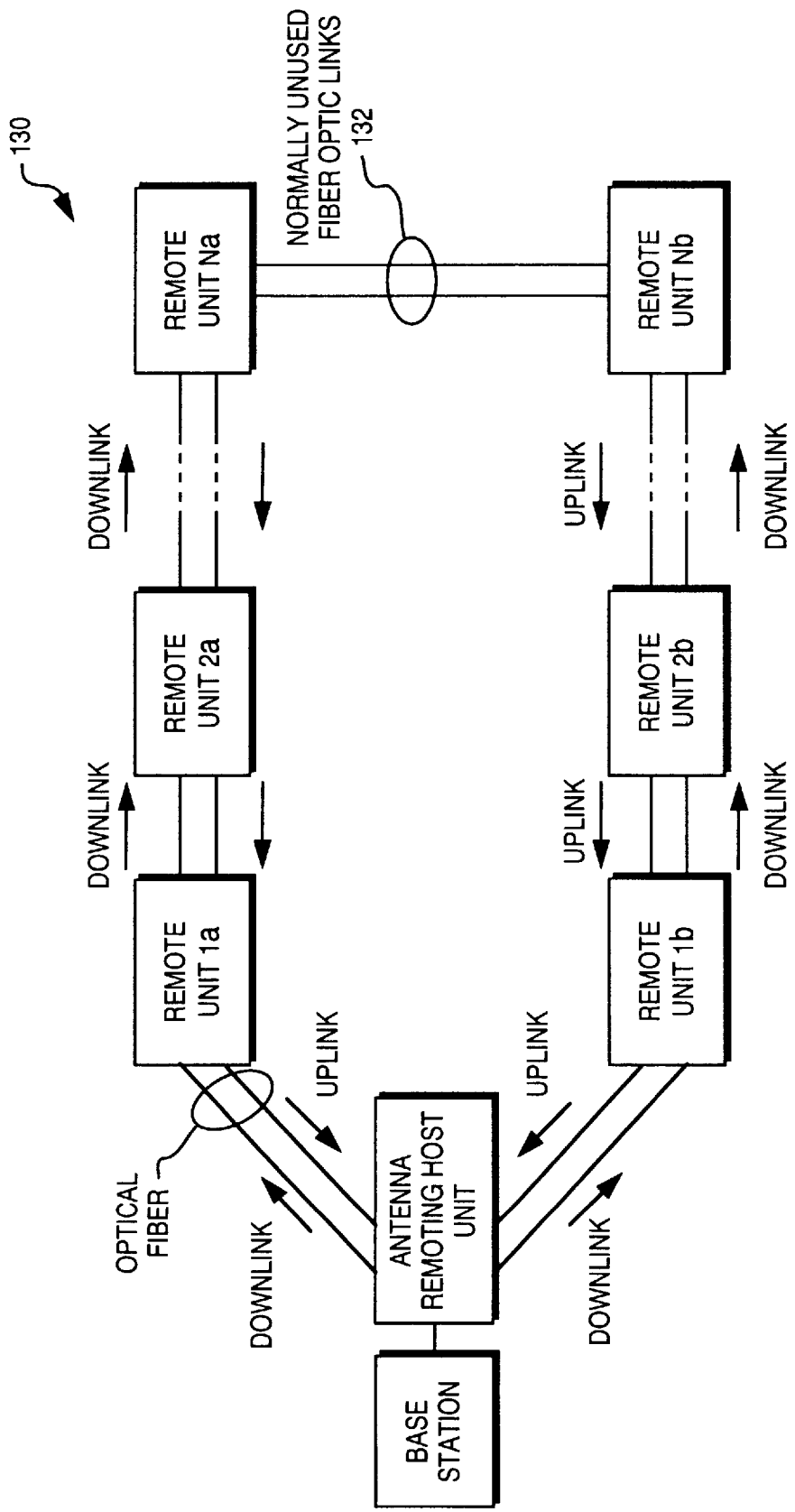
FIG. 5 is a schematic diagram of the reconfigurable ring architecture of this invention for RF signal transmission to remote units with an unused link in the middle.

Another embodiment of the invention is illustrated in FIG. 5 where ring configuration 130 positions the unused pair of fiber optic cables 132 in the middle of the ring. The multiplexing in this configuration is similar to that described above, except that in normal operation the downstream signals meant for the upper part of the ring are sent only to the upper part, and those meant for the lower part are sent only to the lower part. This multiplexed ring configuration or architecture 140 is shown in detail in FIG. 6. To increase system performance during normal operation, only the downlink signals 142 meant for the upper part of the ring (referred to remote units #1-a and N-a in FIG. 6) are sent over the upper units, and the downlink signals 144 meant for the lower part of the ring (referred to remote units #1-b and N-b in FIG. 6) are sent over the lower units.

Figure 6A:
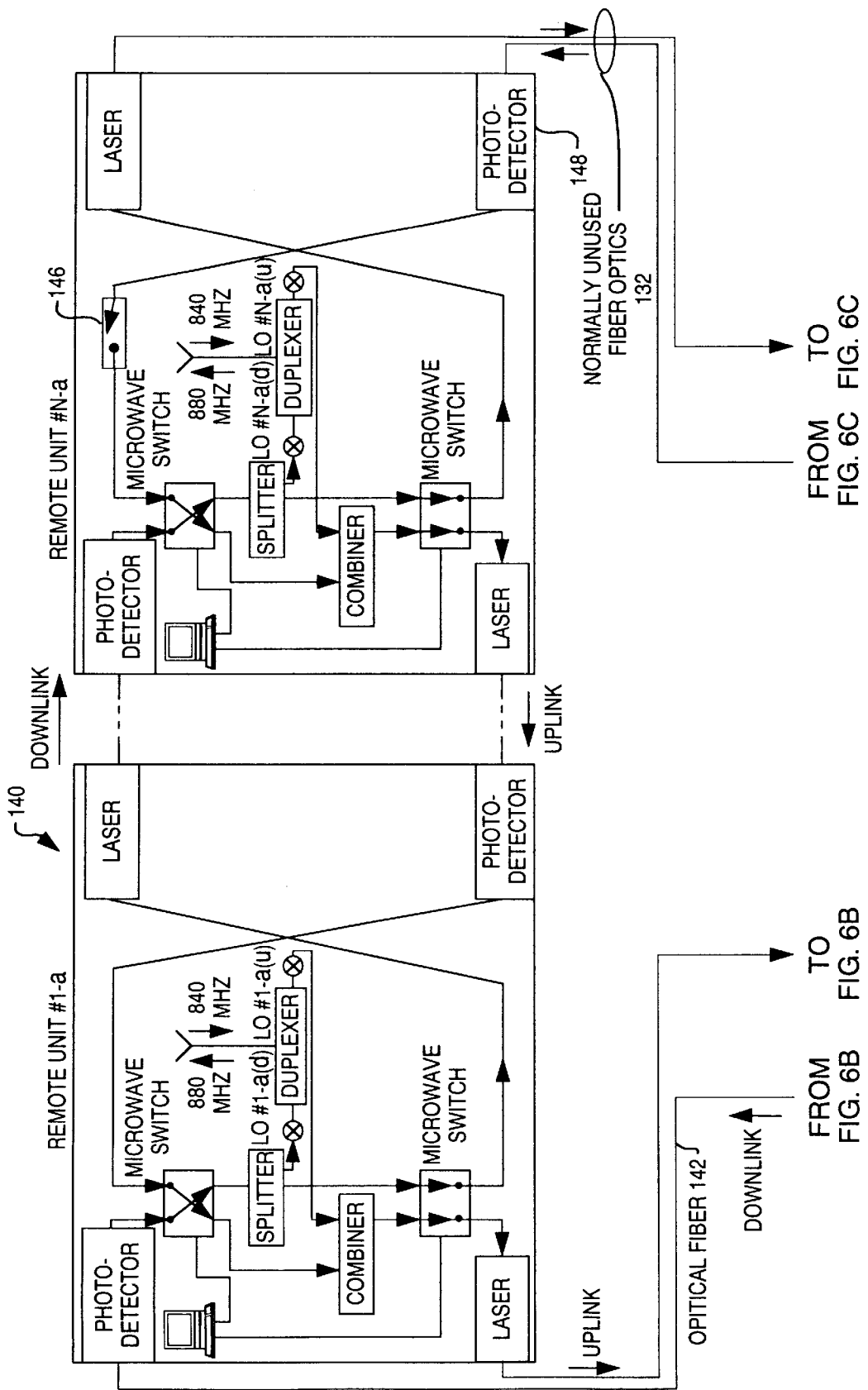
FIG. 6 is a schematic representation a multiplexed ring architecture of this invention for RF signal transmission to remote units with an unused link in the middle.
Figure 6B:
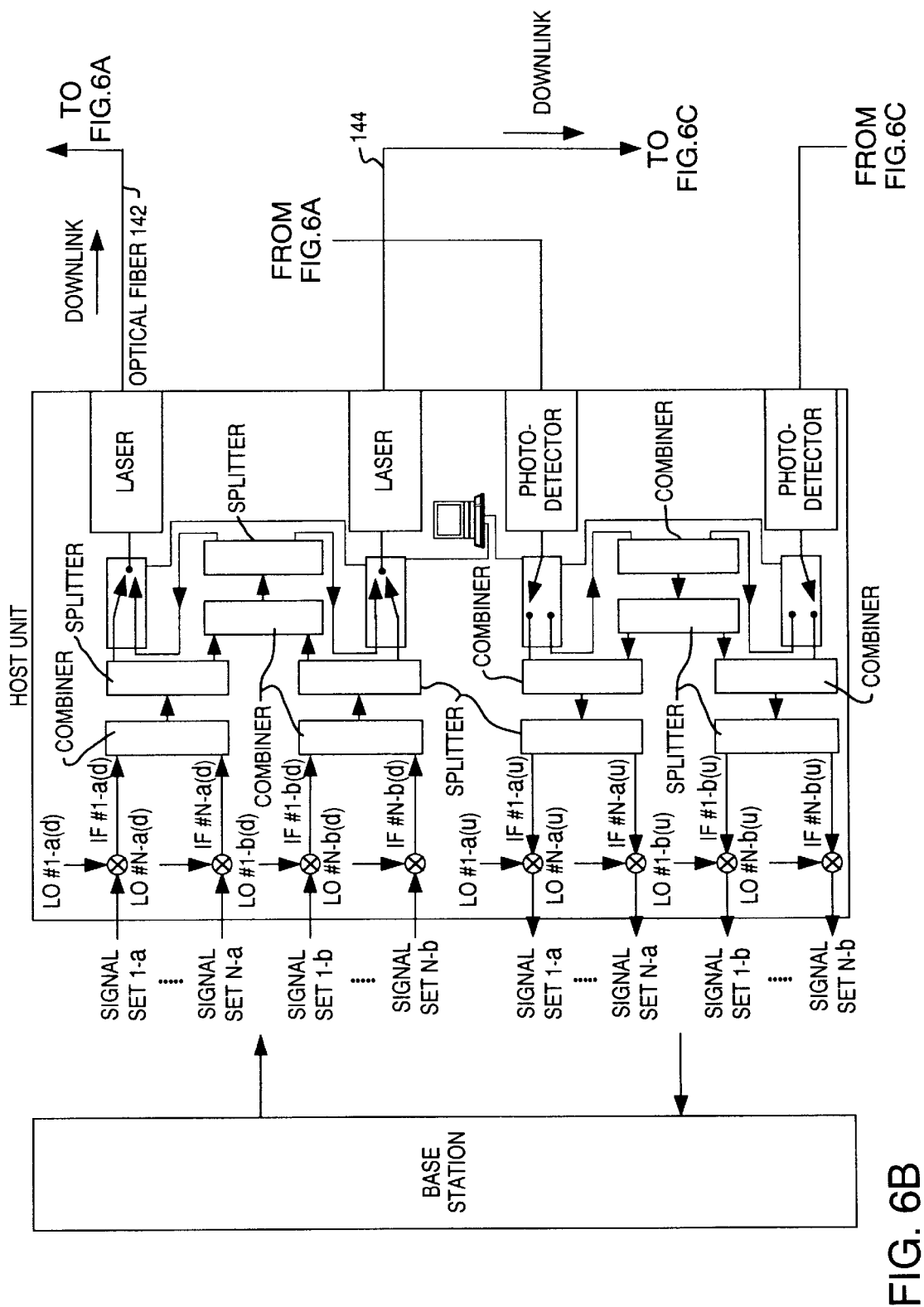
Figure 6C:
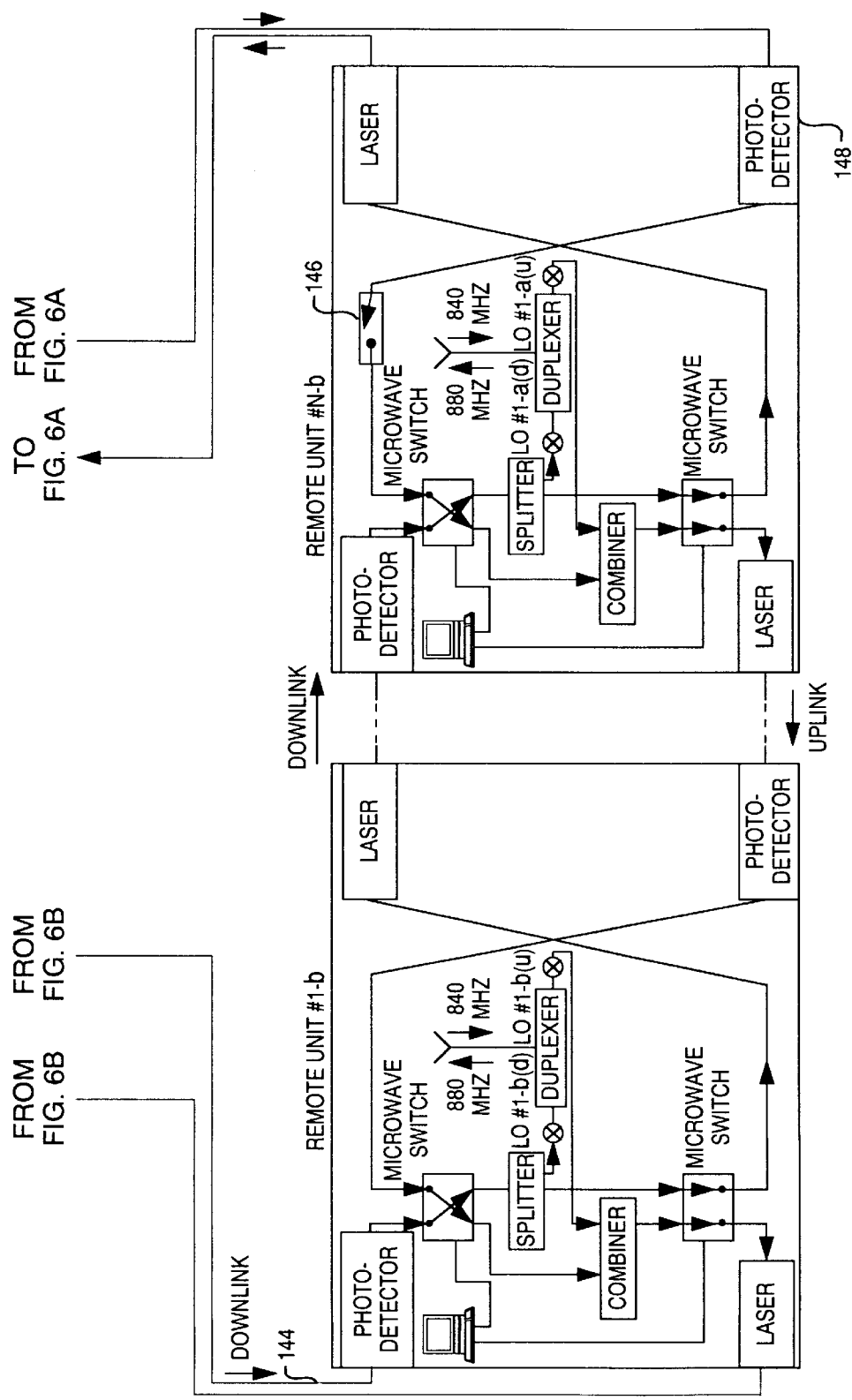

In FIG. 6, the last remote units in both the upper group (#N-a) and in the lower group (#N-b) are shown with an optical on/off microwave switch 146 directly following one of the photodetectors 148. Under normal conditions, these two switches 146 are open, which serves to stop the downlink signal from one half of the ring from being mixed with the uplink signal from the other half of the ring. Without these switches, these downlink signals would all eventually be filtered out; however, they might increase the system's non-linear distortions by raising the overall signal level.

Reducing the number of remote units served by any one fiber optic link increases performance by decreasing the amount of intermodulation distortion. This is the advantage of putting the unused optical fiber link 132 in the middle of the ring. The disadvantage, as will be discussed below in describing the methods of reconfiguration, is the degradation in system performance when this type of ring is reconfigured after a fault.

Furthermore, there are a number of other multiplexing techniques that would be acceptable with the system of the present invention For example, the uplink and downlink signals could be first downconverted to baseband and then digitized, and then these digitized signals could be frequency division multiplexed as described above. Another multiplexing scheme which would be acceptable within this inventive system would be the use of wavelength division multiplexing. For example, each remote unit could be assigned its own wavelength laser at the host unit, and would use optical filters to chose the signal meant for it. The uplink would work in the same way, with each uplink laser having a distinct wavelength, with optical filters at the host unit.

The major advantages of the reconfigurable architecture of the present invention is clearly set forth below when one considers the situation when a failure occurs either within a remote unit or in a fiber optic link between the units. The following describes how no single point of failure (except for the host unit) can cause more than one remote unit to fail.

Figure 7:
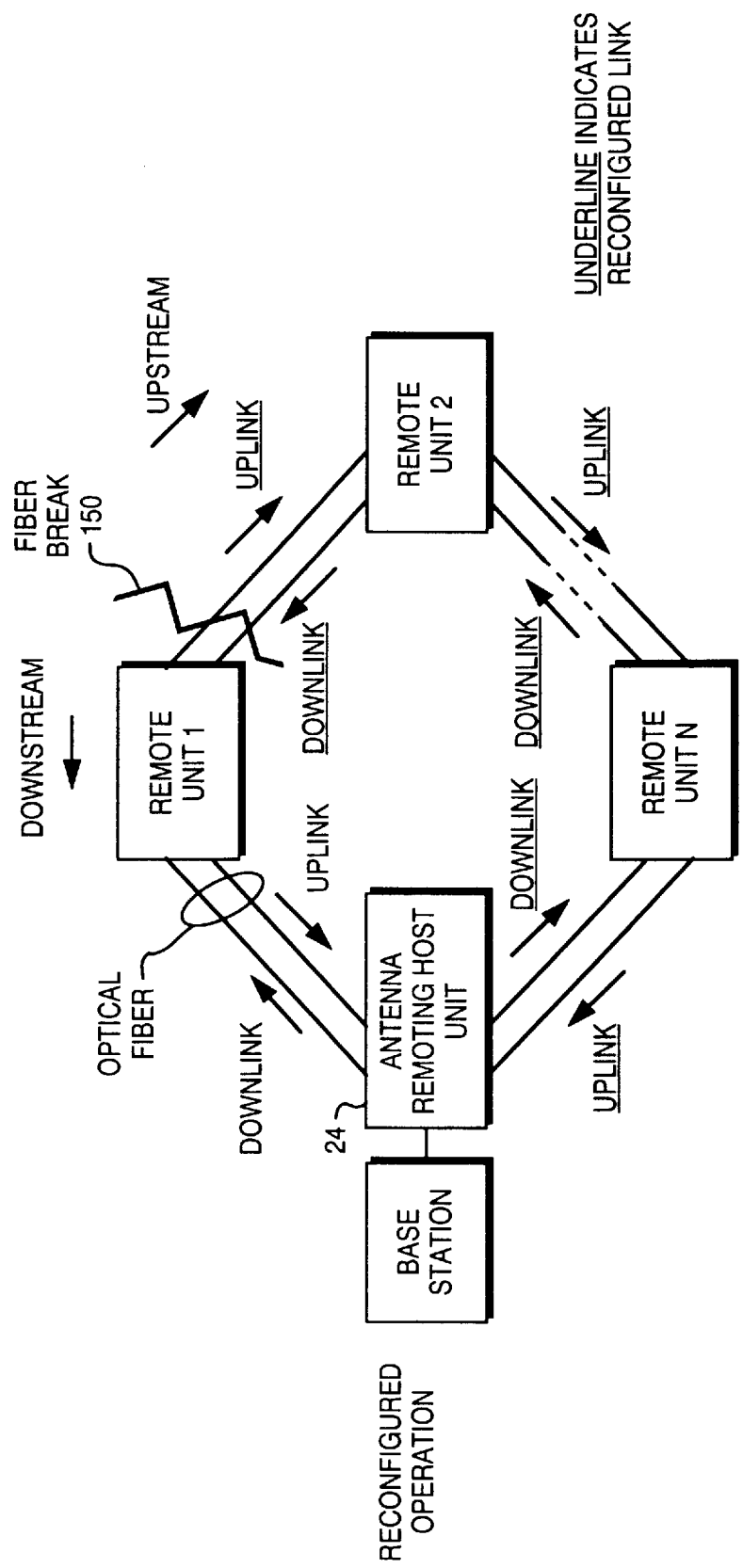
FIG. 7 is a schematic diagram of the reconfigurable ring architecture of this invention for RF signal transmission to remote units illustrating reconfiguration based on a broken optical fiber.

Referring to FIG. 7 of the drawings, assume a failure (a break 150 in the optic fiber link occurs, for example) is detected between the host unit 24 and a particular remote unit. In FIG. 7 this failure, for example, is shown to occur between remote units #1 and #2. The remote units upstream of the failure (remote units #2 through #N) reset their microwave switches 152 (shown in FIG. 8), with the result that their downlink lasers and photodetectors become their uplink lasers and photodetectors, and their uplink lasers and photodetectors become their downlink lasers and photodetectors. This operation is explained in greater detail below. If a failure is detected between a particular remote unit and the last remote unit in the ring, that particular remote unit does not reconfigure. This change in downlink and uplink operation can be clearly seen when comparing FIG. 2 with FIG. 7.

Figure 8A:
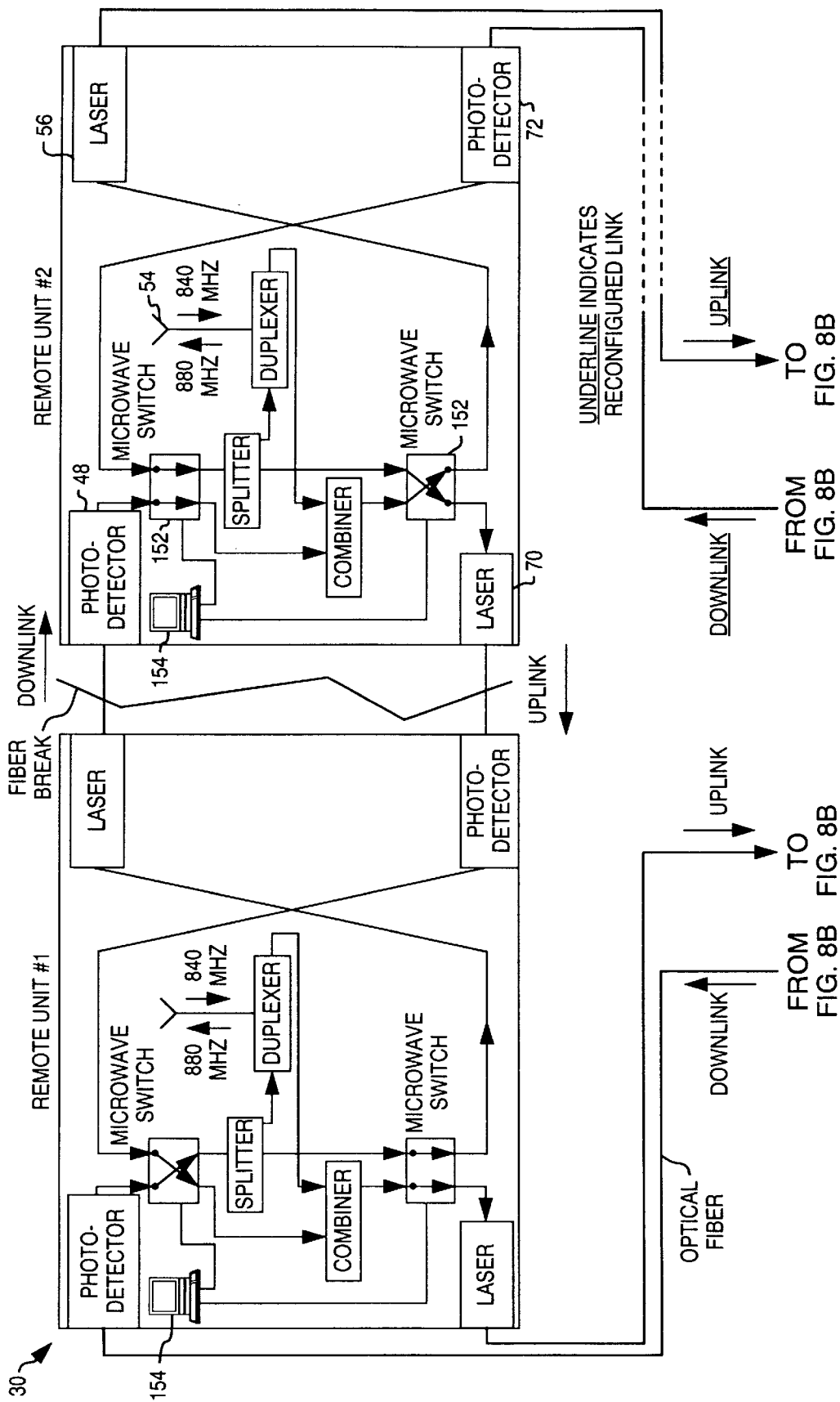
FIG. 8 is a schematic representation of a broadcast ring architecture of this invention for RF signal transmission to remote units illustrating reconfiguration based on a broken optical fiber.
Figure 8B:
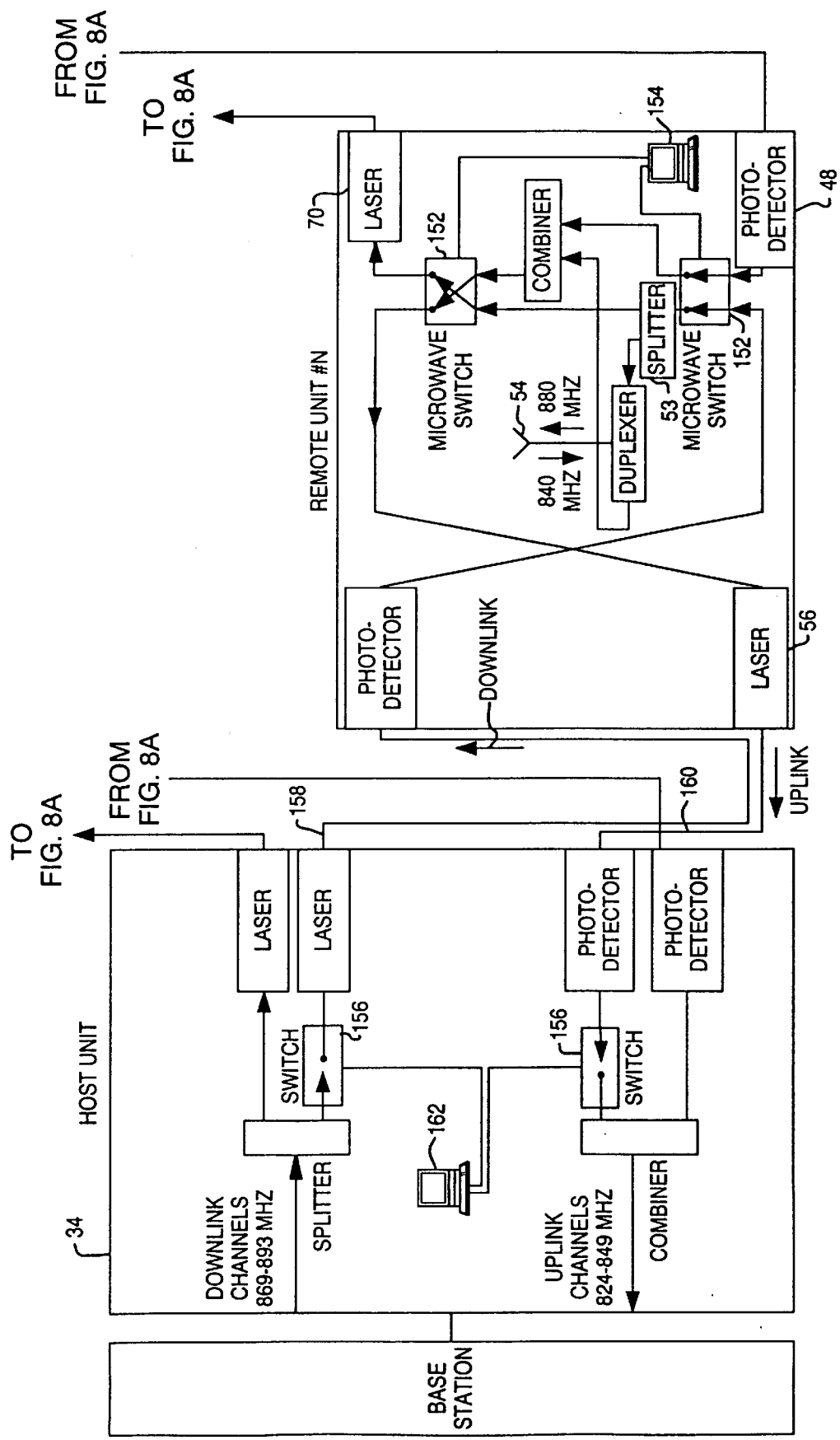

FIG. 8 of the drawings shows this reconfiguration in detail for the broadcast ring architecture 30. FIG. 3 depicts the normal operation of the broadcast ring architecture 30. In FIG. 8, the reconfigured system is shown after a fiber break between remote units #1 and #2 as also depicted in FIG. 7. In this reconfiguration operation, all the remote units from #2 to #N reset or switch their microwave switches 152 which are located in each remote unit. A conventional computer 154, in each remote unit, is used to control the switches 152 and the reconfiguration, using such input as dc optical power levels received from each link and received RF powers. The end result of the switching of microwave switches 152 is that the outside loop between remote units #2 and #N, which was previously the downlink, has now become the uplink. The same is true of the inside loop between remote units #2 and #N, which has changed from uplink to downlink. At the time of reconfiguration, also shown in FIG. 8, the two microwave switches 156 located in the host unit 34 are also closed to turn on the normally unused optical fiber link 158/160. Switches 158 and 160 are similarly controlled by computer 162.

The mode of operation with respect to a break in the broadcast ring 30 as depicted in FIG. 8 is as follows. In FIG. 8, an uplink signal received by remote unit #1 follows the same path as it would have before the break was detected, as would the downlink signal transmitted to remote unit #1 from the host unit. However, an uplink signal received at the antenna 54 of remote unit #2 would follow a different path, since it is upstream of the failure. The uplink signal would be combined with the output (or lack thereof) of the photodetector 48 which is now inoperative due to the fiber break. The uplink signal is then diverted by the microwave switch 152, and sent toward the laser 56 in communication with the next remote unit N (or #3), that is a remote unit would be placed between #N and #2. This laser 56 was previously responsible for sending the downlink signal to remote unit N (or #3), but has now become the uplink transmitter. This uplink signal is received at remote unit N (or #3), and combined with the uplink signal from remote unit #N, and then sent to a next remote unit, if any. This process is repeated until the combined uplink signals travel over the normally unneeded link from the last remote unit #N to the host unit 34.

The downlink signal is reconfigured in much the same way. In the last remote unit (#N), the downlink signal is now received from the host unit 34 directly, due to the reconfiguration of the two microwave switches. This downlink signal is divided into two at a splitter 53, and one part is transmitted out the antenna 54, while the other part is sent to the laser 70 that had previously been used to send the uplink signal to remote unit #N-1. This downlink signal continues in this same way until it reaches remote unit #2. In remote unit #2, the downlink signal is again split in two parts, with one part broadcast out the antenna, and the other part sent to the laser 70 that transmits to remote unit #1. Since this fiber has broken, this downlink signal terminates at this point. As before, remote unit #1 does not need the downlink signal, since it is receiving it via its normal, unreconfigured path directly from the host unit 34.

Figure 9A:
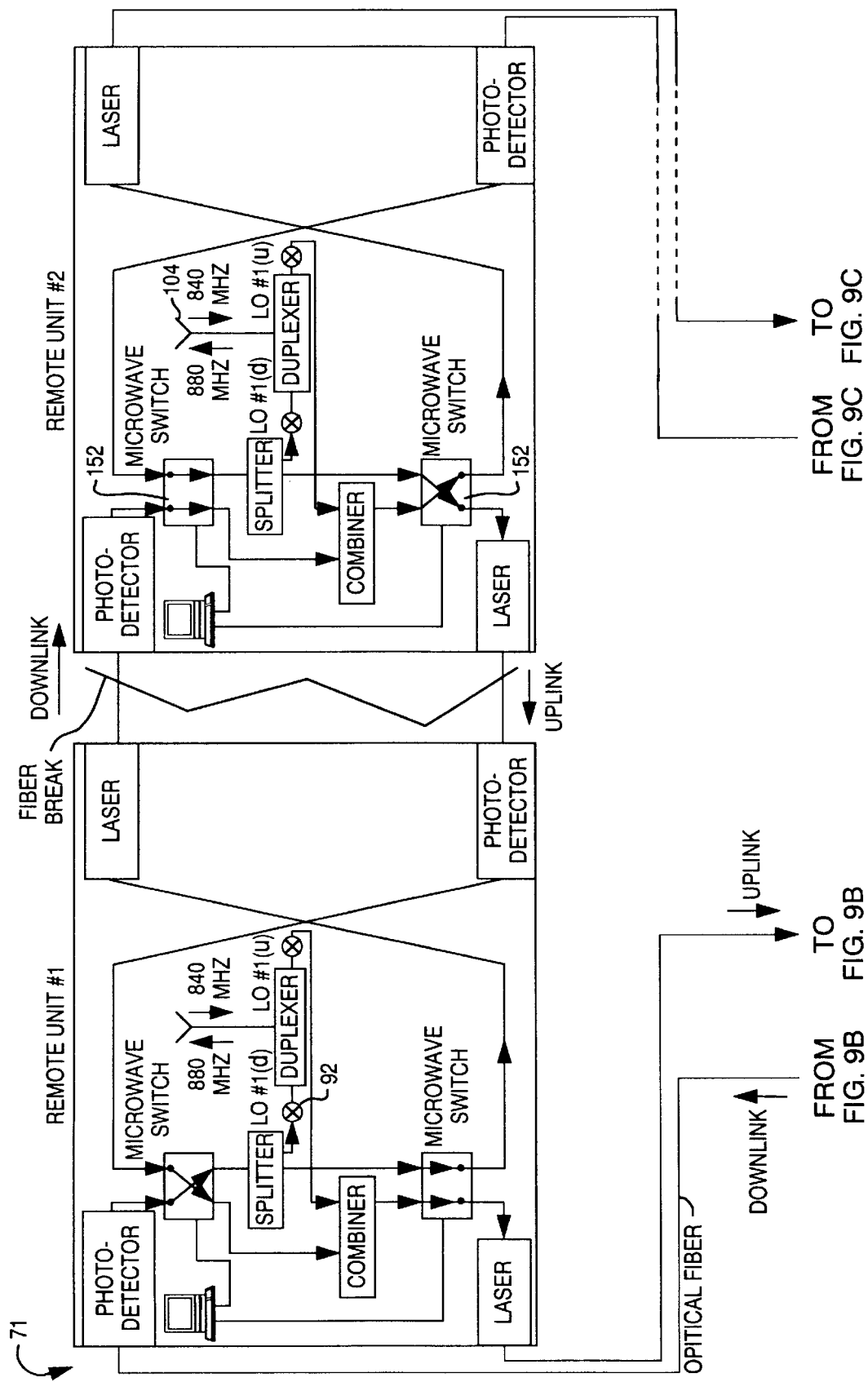
FIG. 9 is a schematic representation of a multiplexed ring architecture of this invention for RF signal transmission to remote units illustrating reconfiguration based on a broken optical fiber.
Figure 9B:
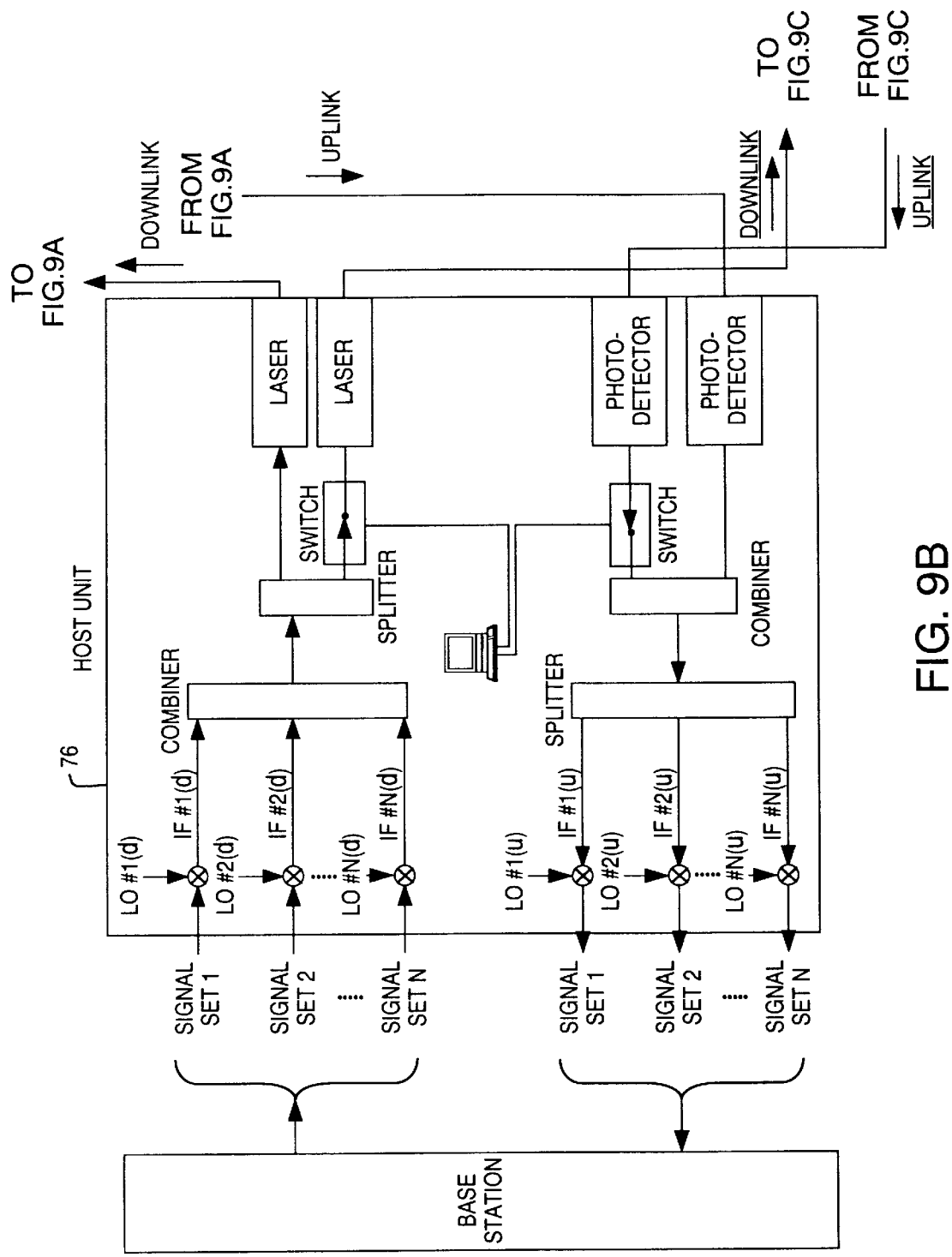
Figure 9C:
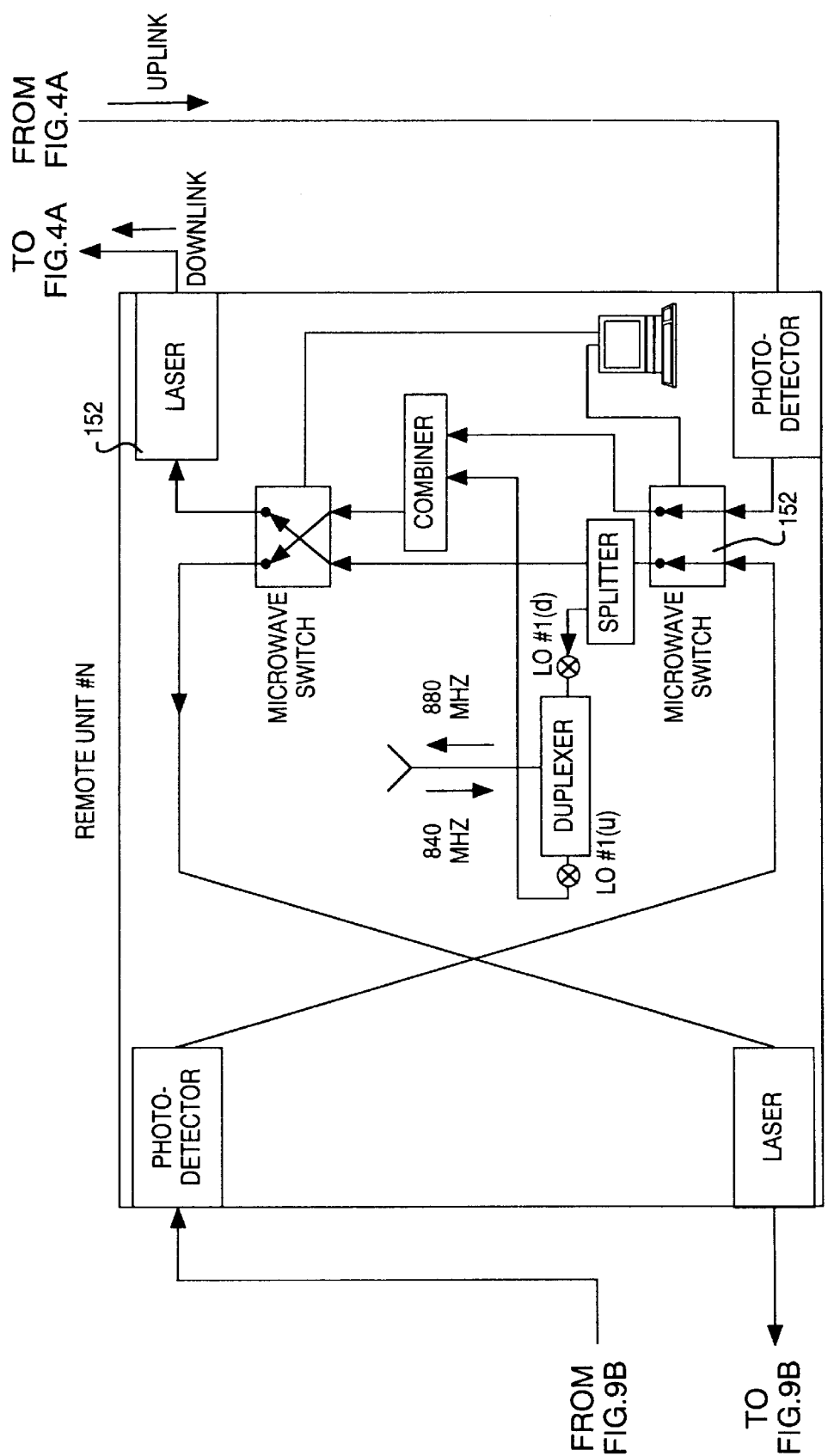

FIG. 9 of the drawings shows this reconfiguration in detail for the multiplexed ring architecture 71, which is shown in normal operation in FIG. 4. In FIG. 9, the reconfigured system is shown after an optical fiber break between remote units #1 and #2 as also depicted in FIG. 7. The resetting of switches 152 reconfigures the multiplexed ring architecture 71 similarly to the reconfiguration of broadcast architecture 30.

This multiplexed ring 71 reconfigures in much the same way as the broadcast ring. In FIG. 9, an uplink signal received by remote unit #1 follows the same path as it would have before the break was detected, as would the downlink signal transmitted to remote unit #1 from the host unit 76. However, an uplink signal received at the antenna 104 of remote unit #2 would follow a different path, since it is upstream of the failure. The uplink signal would first be converted to its own intermediate frequency, and then would be combined with the output (or lack thereof) of the photodetector which is now inoperative due to the fiber break. The uplink signal is then diverted by the microwave switch 152, and sent toward the laser in communication with the next remote unit N (or #3) if placed between remote unit #N and #2. This laser was previously responsible for sending the downlink signal to remote unit N (or #3), but has now become the uplink transmitter. This uplink signal is received at remote unit N (or #3), and then sent to the next N. This process is repeated until the combined uplink signals travel over the normally unneeded link from the remote unit N to the host unit 76.

The downlink signal is reconfigured in much the same way. In the last remote unit (#N), the downlink signal is now received from the host unit directly, due to the reconfiguration of the two microwave switches. This downlink signal is divided into two at a splitter, and one part is transmitted to the local oscillator 92, where the correct intermediate frequency is selected and upconverted to the cellular band before it is transmitted out the antenna. The other part is sent to the laser that had previously been used to send the uplink signal to remote unit #2. This downlink signal continues in this same way until it reaches remote unit #2. In remote unit #2, the downlink signal is again split in two parts, with one part transmitted to the local oscillator, where the correct intermediate frequency is selected and upconverted to the cellular band before it is transmitted out the antenna, and the other part is sent to the laser that transmits to remote unit #1. Since this fiber has broken, this downlink signal terminates at this point. As before, remote unit #1 does not need the downlink signal, since it is receiving it via its normal, unreconfigured path directly from the host unit.

Figure 10A:
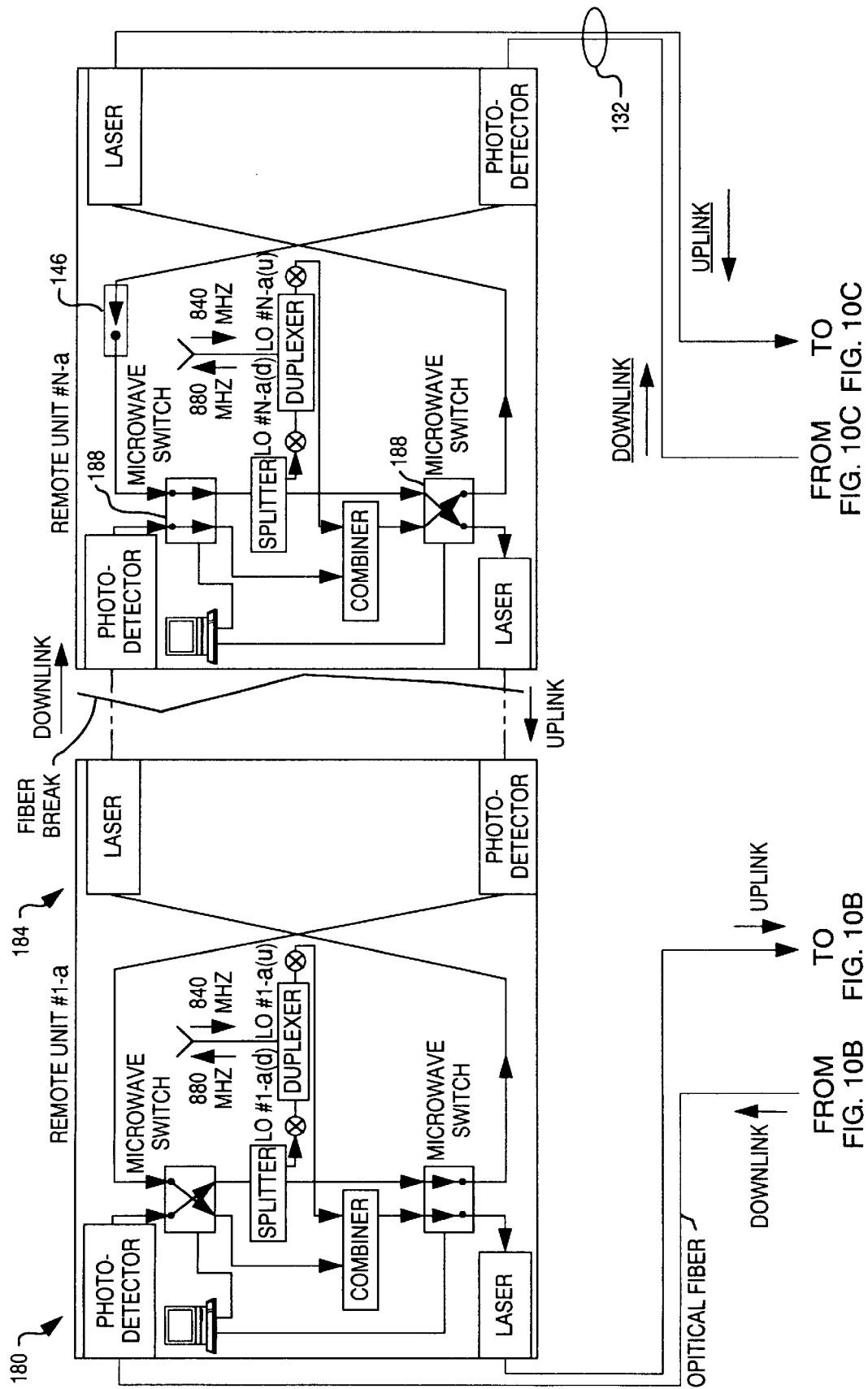
FIG. 10 is a schematic representation of a multiplexed ring architecture of this invention for RF signal transmission to remote units illustrating reconfiguration based on a broken optical fiber with an unused link in the middle.
Figure 10B:
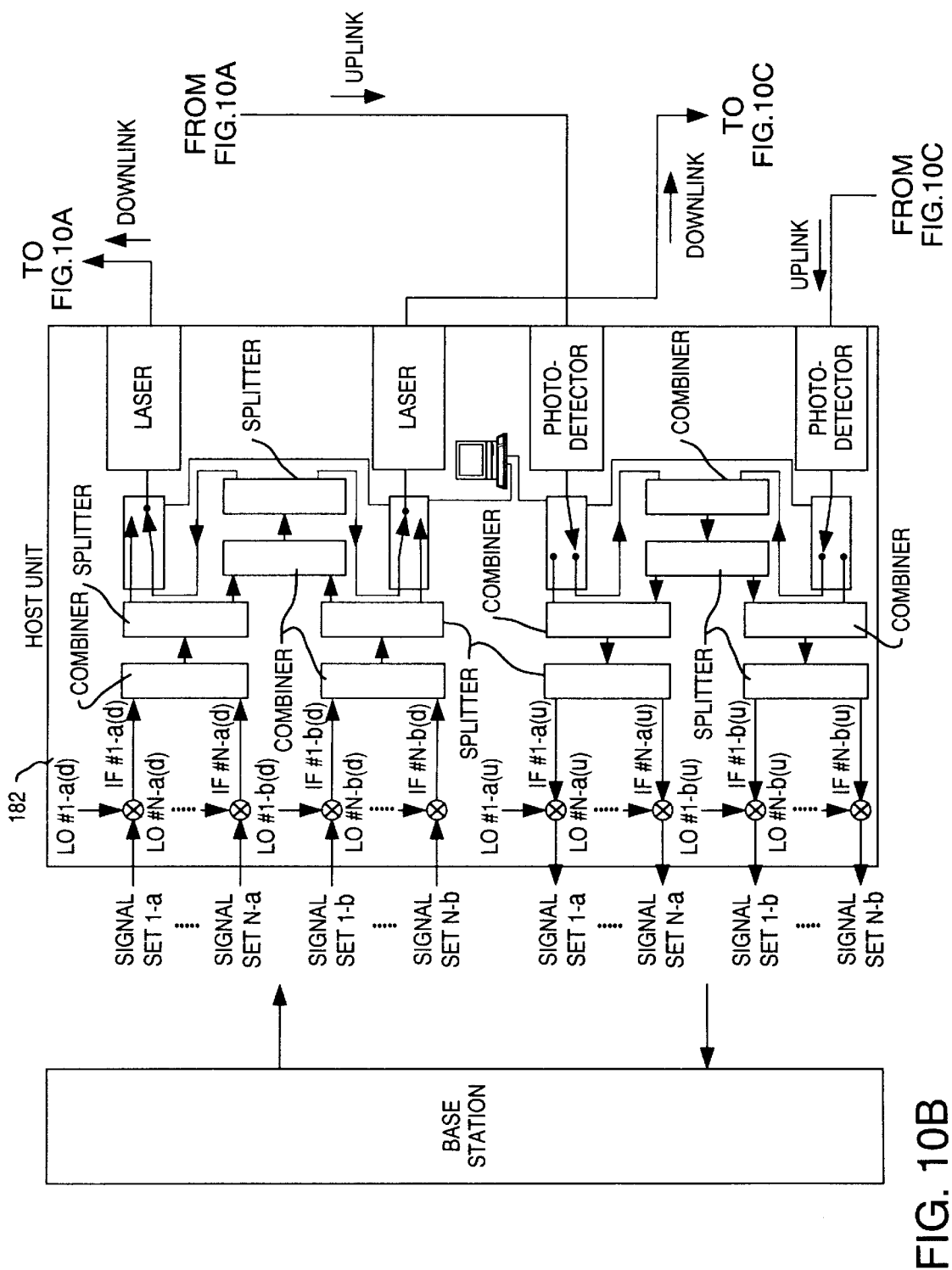
Figure 10C:
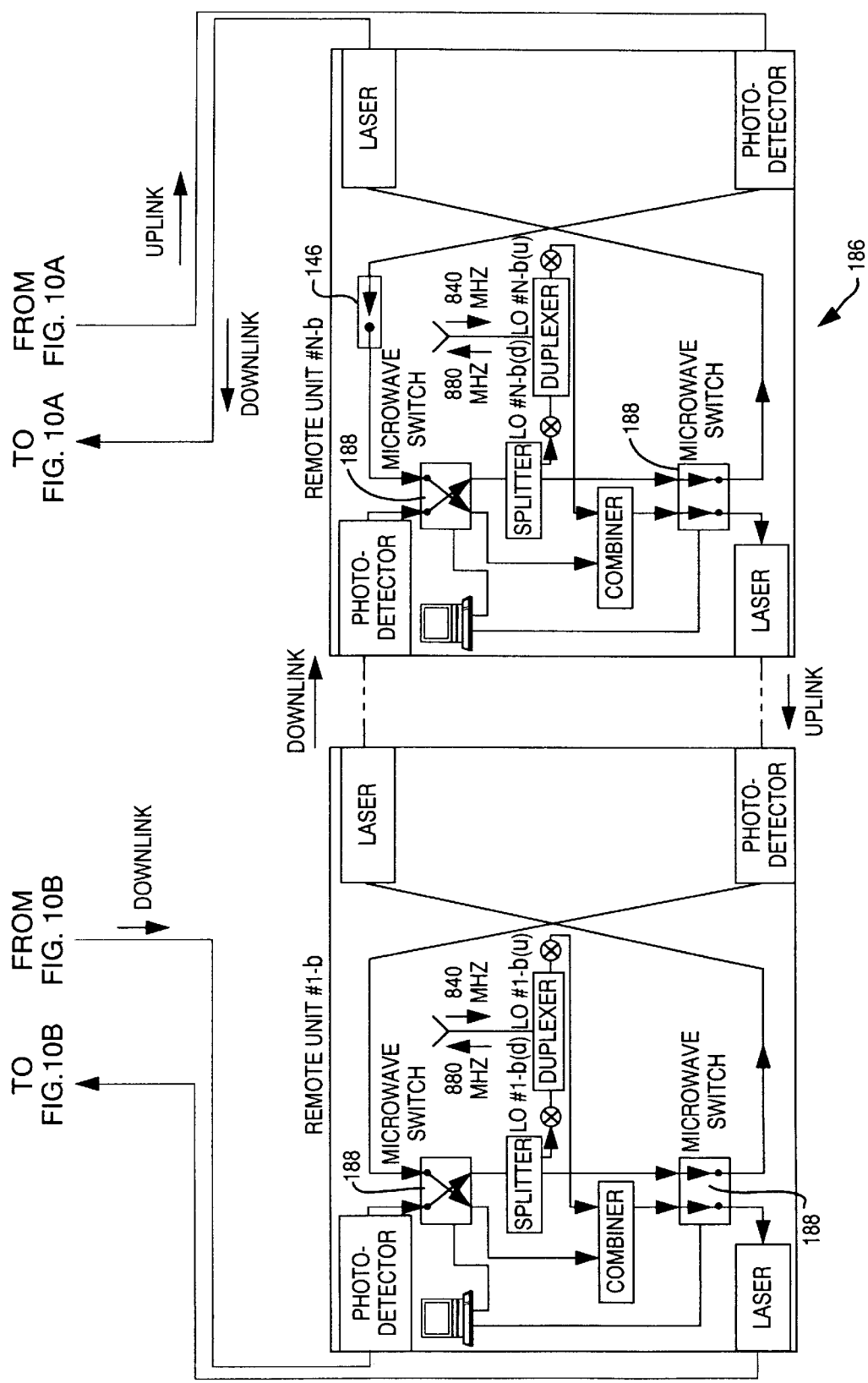

FIG. 10 of the drawings illustrates the reconfiguration of a multiplexed ring architecture 180 when the unused link 132 (similar to FIG. 5) is in the middle of the ring rather than at the end as in FIG. 7. In such a configuration, the host unit 182 is configured such that all the downlink channels are sent to both halves 184 and 186 of the ring. In FIG. 10, the two switches 146 close under reconfiguration conditions. This allows the downlink from the lower part of the ring to reach remote unit #N-a, and the uplink signal from remote unit #N-a to reach the lower ring. In the architecture 180 of FIG. 10, in the event of a failure or break between remote unit #N-a and unit 1-a, the remote unit #N-a is the only remote unit that reconfigures or switches its two microwave switches 188. The remote units in the lower part of the ring (remote units #1b–#Nb) did not reset or switch their microwave switches 188 because the failure did not occur between those units and the host unit 182.

The reconfiguration shown in FIG. 10 could occur in a number of other variations. For example, with each signal having its own microwave switch, the reconfiguration could occur such that only the necessary signals travel down each reconfigured link This would increase the host unit hardware costs and complexity, but it would lessen the degradation of signal quality that occurs upon reconfiguration. Another reconfiguration of the system shown in FIG. 10 would be to always send all the signals to both halves of the ring.

In the case of a multiplexed (or broadcast) ring with an unused link in the middle (FIG. 10), the system for reconfiguration is slightly different. In this case, when a fault is detected, only those remote units located between the fault and the unused link reconfigure their microwave switches; all others do not. For example, in FIG. 10 there is shown a break between the 1-a and remote unit N-a on the upper branch 184 of the loop. In this case none of the remote units on the lower branch 186 of the loop reconfigure. After reconfiguration, the downlink signal to the Nth remote unit in the (a) branch arrives from the Nth remote unit in the (b) branch. In the same way, the uplink signal from the Nth remote unit in the (a) branch travels after reconfiguration to the Nth remote unit in the (b) branch, and from there through the entire (b) branch to the host unit.

Although the invention has been described with reference to particular embodiments, it will be understood that this invention is also capable of further and other embodiments within the spirit and scope of the appended claims. For example, the switching could be performed optically using optical switches rather than electronic microwave switches. Further, if the reconfiguration were performed in a wavelength division multiplexing system, the switching elements would be either tunable lasers or tunable wavelength filters.

What is claimed is:

1. A reconfigurable ring architecture system for transporting RF signals to a plurality of different remote sites, said system comprising:
   host means for transmitting signals to said plurality of remote sites and for receiving signals from said plurality of remote sites;
   at least three remote units, each located at a different one of said remote sites;
   means for serially interconnecting said host means to said remote units through all said remote units and back to said host means;
   each of said remote units having:
      means for receiving said transmitted signals and means for receiving other signals from another source;
      means for splitting said transmitted signals into two parts, one part of said signals being output from said remote unit and the other part of said signals being transferred through said interconnecting means to adjacent remote units and then back to said host means; and
      means for transferring said other signals from said remote unit through said interconnecting means to adjacent remote units and then back to said host means;
   whereby transmission and reception of signals takes place even in the event of failure of a remote unit or a portion of said interconnection means.

2. A reconfigurable ring architecture system as defined in claim 1 wherein each of said remote units further includes:
   means for combining said received other signals with other signals from said adjacent remote units for transfer to adjacent remote units and then back to said host means.

3. A reconfigurable ring architecture system as defined in claim 2 wherein said other part of said signals being transferred are transferred through said interconnecting means to said adjacent remote units upstream from said remote unit and then back to said host means; and
   said combined signals from said remote unit are transferred through said interconnecting means to said adjacent remote units downstream from said remote unit and then back to said host means.

4. A reconfigurable ring architecture system as defined in claim 3 further comprising:
   means for reversing the upstream and downstream paths of preselected signals through said interconnecting means in the event of certain conditions, the conditions being the failure (1) of a remote unit, or (2) in the fiber interconnecting (a) two remote units, or (b) a remote unit and the host unit.

5. A reconfigurable ring architecture system as defined in claim 4 wherein said signal path reversing means comprises a pair of switches in each of said remote units, said switches being selectively reversed upon recognition of said certain conditions.

6. A reconfigurable ring architecture system as defined in claim 5 wherein said host means comprises:
   means for converting electrical signals into optical signals, and said optical signals are said signals being transmitted therefrom to said remote units.

7. A reconfigurable ring architecture system as defined in claim 6 further comprising:
   means for separating the signals received by each of said remote units into a different individual frequency for broadcast from each of said remote units; and
   means for separating said other signals received by said remote units into a different individual frequency at each of said remote units.

8. A reconfigurable ring architecture system as defined in claim 7 wherein said frequency separating means are frequency converters.

9. A reconfigurable ring architecture system as defined in claim 1 wherein said host means comprises:
   means for converting electrical signals into optical signals, and said optical signals are said signals being transmitted therefrom to said remote units.

10. A reconfigurable ring architecture system as defined in claim 1 wherein said means for receiving said other signals is a transmitter/receiver antenna.

11. A reconfigurable ring architecture system as defined in claim 1 wherein said means for receiving said transmitted signals is a photodetector.

12. A reconfigurable ring architecture system as defined in claim 9 further comprising means for combining said other signals received from said transmitter/receiver with said other signals from said adjacent remote units.

13. A reconfigurable ring architecture system for transporting RF signals to a plurality of different remote sites, said system comprising:
   host means for transmitting signals to said plurality of remote sites and for receiving signals from said plurality of remote sites;
   at least four remote units, with at least two of said remote units forming a first remote system and with at least two of said remote units forming a second remote system;

means for serially interconnecting said host means to said remote units through all said remote units and back to said host means;

each of said remote units in said first remote system and said second remote system having:

means for receiving said transmitted signals and means for receiving other signals from another source;

means for splitting said transmitted signals into two parts, one part of said signals being output from said remote unit and the other part of said signals being transferred through said interconnecting means to adjacent remote units upsteam therefrom;

means for transferring said other signals from said remote unit through said interconnecting means to adjacent remote units downstream therefrom; and means, activated under certain conditions, for reversing the upstream and downstream paths of preselected signals through said interconnecting means;

whereby transmission and reception of signals takes place even in the event of failure of a remote unit or a portion of said interconnection means.

14. A reconfigurable ring architecture system as defined in claim 13 further comprising:

means for selectively controlling the passing of signals through said interconnecting means between said first and said second remote systems.

15. A reconfigurable ring architecture system as defined in claim 14 wherein said host means comprises:

means for converting electrical signals into optical signals, and said optical signals are said signals being transmitted therefrom to said remote units.

16. A reconfigurable ring architecture system as defined in claim 14 wherein said means for receiving said other signals is a transmitter/receiver antenna.

17. A reconfigurable ring architecture system as defined in claim 16 further comprising means for combining said other signals received from said transmitter/receiver with said other signals from said adjacent remote units.

18. A reconfigurable ring architecture system as defined in claim 17 further comprising:

means for separating the signals received by each of said remote units into a different individual frequency for broadcast from each of said remote units; and means for separating said other signals received by said remote units into a different individual frequency at each of said remote units.

19. A method of transporting RF signals to a plurality of different remote sites substantially unaffected by failures occurring with respect to the sites, said method containing the steps of:

providing means for transmitting signals to said plurality of remote sites and for receiving signals from said plurality of remote sites;

providing a different remote unit at each of said different remote sites;

sequentially interconnecting said transmitting and receiving means with said remote units;

receiving said transmitted signals at said remote units;

outputting part of said signals from said remote units and transmitting the other part of said signals to adjacent remote units upstream therefrom and then back to said transmitting and receiving means;

receiving other signals at said remote units;

transferring said other signals from said remote units to adjacent remote units downstream therefrom and then back to said transmitting and receiving means;

reversing, in the event of predetermined conditions, the upstream and downstream paths of preselected signals affected by said conditions;

whereby substantially continuous transmission and reception of signals takes place between said transmitting and receiving means and said remote units even in the event of failures which occur with respect to said remote units.

20. A method of transporting RF signals to a plurality of different remote sites as defined in claim 19 further comprising the step of dividing said remote units into a first and second system of remote units.

* * * * *